United States Patent
Hamada et al.

(10) Patent No.: US 7,026,991 B2
(45) Date of Patent: *Apr. 11, 2006

(54) RADIO TRANSCEIVER AND METHOD OF CONTROLLING DIRECTION OF RADIO-WAVE EMISSION

(75) Inventors: Hajime Hamada, Kawasaki (JP); Michiharu Nakamura, Kawasaki (JP); Yasuyuki Oishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 21 days.

This patent is subject to a terminal disclaimer.

(21) Appl. No.: 10/859,775

(22) Filed: Jun. 3, 2004

(65) Prior Publication Data

US 2004/0266354 A1 Dec. 30, 2004

Related U.S. Application Data

(60) Continuation of application No. 10/413,421, filed on Apr. 14, 2003, now Pat. No. 6,864,839, which is a division of application No. 09/746,439, filed on Dec. 21, 2000, now Pat. No. 6,577,273.

(30) Foreign Application Priority Data

Feb. 23, 2000  (JP) ............................. 2000-045674

(51) Int. Cl.
 *G01S 5/04* (2006.01)
(52) U.S. Cl. .................................................. 342/442
(58) Field of Classification Search ................ 342/361, 342/367, 372, 412, 442; 455/91, 92, 561, 455/562.1
See application file for complete search history.

(56) References Cited

U.S. PATENT DOCUMENTS

| | | | |
|---|---|---|---|
| 4,001,828 A | 1/1977 | Culpepper | |
| 4,021,807 A | 5/1977 | Culpepper et al. | |
| 4,072,950 A | 2/1978 | Swanson | |
| 4,528,567 A | 7/1985 | Miles et al. | |
| 4,665,404 A | 5/1987 | Christy et al. | |
| 4,978,963 A | 12/1990 | Thorpe | |
| 5,056,106 A | 10/1991 | Wang et al. | |
| 5,379,047 A | 1/1995 | Yokev et al. | |
| 5,530,452 A | 6/1996 | Yokev et al. | |
| 6,414,673 B1 | 7/2002 | Wood et al. | |
| 6,864,839 B1 * | 3/2005 | Hamada et al. | 342/442 |

FOREIGN PATENT DOCUMENTS

EP  0 583 522 A2  2/1994

(Continued)

*Primary Examiner*—Dao Phan
(74) *Attorney, Agent, or Firm*—Katten Muchin Rosenman LLP

(57) ABSTRACT

Disclosed is a method of controlling direction of radio-wave emission of a base-station transmitter which emits radio waves upon providing the radio waves with directivity in the direction of a receiver. Two antennas of a base station that are disposed at different positions transmit first and second signals that have been spread by mutually orthogonal spreading codes. A mobile station has a phase detector for receiving the first and second signals transmitted from respective ones of the antennas and obtaining a phase difference between these signals, and a direction estimator for calculating the direction of the mobile station, as seen from the base station, based upon the phase difference and for feeding back a signal representing the calculated direction from the mobile station to the base station. The transmitter of the base station transmits data toward the receiver in the calculated direction using a directional antenna.

2 Claims, 15 Drawing Sheets

FOREIGN PATENT DOCUMENTS

| | | |
|---|---|---|
| EP | 0 949 709 A1 | 10/1999 |
| EP | 0 940 934 A3 | 4/2001 |
| GB | 2 355 159 A | 4/2001 |
| JP | 4-24576 | 1/1992 |
| JP | 7-181242 | 7/1995 |
| JP | 11-271434 | 10/1999 |
| JP | 11-326484 | 11/1999 |
| WO | WO 99/09677 | 2/1999 |

\* cited by examiner

RADIO TRANSCEIVER AND METHOD OF CONTROLLING DIRECTION OF RADIO-WAVE EMISSION

CROSS REFERENCE TO RELATED APPLICATION

The present application is a continuation application of U.S. patent application Ser. No.: 10/413,421 filed Apr. 14, 2003, now U.S. Pat. No. 6,864,839 which is a divisional of U.S. patent application Ser. No. 09/746,439 filed Dec. 21, 2000. now U.S. Pat. No. 6,577,273.

BACKGROUND OF THE INVENTION

Field of the Invention

This invention relates to a method of controlling the direction of emission of radio waves from a radio transmitter which transmits radio waves (a beam) from a base-station antenna in the direction of a mobile station while providing the radio waves with directivity, to a radio transmitter and radio receiver for implementing this method, and, more particularly, to a method and apparatus for measuring the direction of a mobile station and transmitting a beam in this direction.

In mobile radio communication systems, a base station cannot use a fixed directional pattern for communication with a mobile station; the base station performs communication using a non-directional antenna. However, since transmission by a non-directional antenna emits radio waves in directions in which the target mobile station does not exist, not only is power efficiency poor but the fact that mobile stations other than the target mobile station are subjected to radio interference degrades communication quality. As a consequence of such interference, a frequency that has been used in communication with a certain mobile station can be re-utilized only at a location far enough away for the radio waves to be attenuated sufficiently. This results in inefficient utilization of frequencies. A method of improving frequency utilization efficiency by establishing sectors (sector zones) and using a sector antenna is known in the art (see Okumura, Shinji, "Foundations of Mobile Communications", Electronic Information Communication Institute, 1986). FIG. 21 is a diagram useful in describing a sector antenna. As shown in (a) of FIG. 21, the 360° perimeter of a base station is equally divided to split a cell into a plurality of sectors SC. A sector antenna is an antenna that is allocated to each sector SC. There is no directivity within a sector. The technique for establishing sectors merely reduces the 360° range of non-directivity to a narrower range of non-directivity such as 120°. The narrower sector is still susceptible to interference from other users or subjects other users to interference. Such interference is the main cause of a decline in channel capacity and transmission quality.

For this reason, it is necessary to measure the position of the mobile station successively in order to transmit radio waves with a narrow directivity in the direction of the mobile station, as illustrated in (b) of FIG. 21. The position of a mobile station can be determined if the mobile station is set up for a position measurement system such as the GPS (Global Positioning System). However, not all mobile stations are necessarily capable of utilizing a position measurement system and therefore the method of relying upon a position measurement system is not appropriate. A proposed method that does not employ a position measurement system is to find the direction of arrival of uplink radio waves by subjecting a received signal to signal processing and then transmit radio waves in this direction. For example, see L. C. Godara, "Application of antenna arrays to mobile communications, PT. II; Beamforming and direction-of-arrival considerations," Proc. IEEE, vol. 85, no. 8, pp. 1195–1245, August 1977.

However, the proposed method of measuring the direction of arrival of uplink radio waves by the signal processing of a received signal involves a heavy processing load, such as a requirement to calculate eigenvalues, and necessitates a complicated apparatus.

SUMMARY OF THE INVENTION

Accordingly, an object of the present invention is to measure the direction of a mobile station through a simple arrangement.

Another object of the present invention is to find the direction of a mobile station (the direction in which a radio base station should point its radio waves) through a simple arrangement, and emit the radio waves in this direction upon providing the radio waves with directivity.

A further object of the present invention is to emit radio waves in the measured direction of a mobile station using an array antenna.

(a) Measurement of Receiver Direction

In order to measure the direction of a receiver according to the present invention, (1) first and second signals that have been spread by mutually orthogonal spreading codes are transmitted from antennas of a base station that are disposed at different positions, or the same signal is time-shared and transmitted as first and second signals from antennas of a base station that are disposed at different positions; (2) the first and second signals that have been transmitted from the respective antennas are received by a receiver and the phase difference between these signals is found; and (3) the direction of the receiver as seen from the transmitter of the base station is calculated based upon the phase difference. In this case, in a multipath environment, the path among multipaths along which a signal will arrive earliest is found and the phase difference between the first and second signals that arrive via this path is calculated. If we let D represent the interval between the two antennas, $\lambda$ the wavelength of the radio waves, $\theta$ the direction of the mobile station and $\phi$ the phase difference between the first and second received signals, these will be related as follows: $\phi=2(\pi/\lambda) \cdot D \cdot \sin \theta$. Accordingly, if $\phi$ is measured, then $\theta$ can be found from the above equation. Thus, in accordance with the method of measuring the direction of a receiver according to the present invention, the receiver direction can be measured in a simple manner. Further, according to the present invention, since the direction of a mobile station is measured using a signal that arrives earliest via multipaths, there is no influence from radio waves that arrive owing to reflection or scattering. This makes it possible to measure direction accurately.

(b) Controlling Direction of Radio-wave Emission

In order to emit radio waves with directivity in the direction of a receiver according to the present invention, (1) the direction $\theta$ of a receiver is measured by the above-described method of measuring receiver direction; (2) the direction $\theta$ is fed back from the receiver to the base station; and (3) radio Waves are emitted from the transmitter of the base station in the direction of the receiver on the basis of the receiver direction using a directional antenna, whereby data is transmitted.

According to another aspect of the present invention, (1) the interval between two antennas that emit first and second signals is made equal to the interval between antenna elements of an equally spaced linear array antenna for data transmission; (2) a receiver receives the first and second signals transmitted from the antennas and finds a phase difference $\phi$ between the received signals; (3) the phase difference $\phi$ is fed back from the receiver to a base station; (4) a transmitter of the base station emits radio waves in the direction of the receiver upon providing the radio waves with directivity by applying the phase difference successively in steps of $\phi$ to a data signal that is input to each of the antenna elements of the equally spaced linear array antenna. If this arrangement is adopted, the phase difference need only be detected and fed back, making it unnecessary to calculate the receiver direction $\theta$.

According to another aspect of the present invention, (1) first and second reference signals that have been spread by mutually orthogonal spreading codes are generated; (2) a prescribed phase difference is successively applied to the first reference signal, the resultant signals are input to each of the antenna elements of an equally spaced linear array antenna, the phase difference is successively applied to the second reference signal and the resultant signals are input to each of the antenna elements of the equally spaced linear array antenna in such a manner that a phase reference point of the first and second reference signals shifts by an amount equivalent to the interval between antenna elements of the equally spaced linear array antenna; (3) a receiver receives the first and second reference signals sent from a transmitter of a base station and finds a phase difference $\phi_1$ between the received first and second reference signals; (4) the phase difference $\phi_1$ is fed back from the receiver to the base station; and (5) the transmitter of the base station emits radio waves in the direction of the receiver upon providing the radio waves with directivity by applying the phase difference $\phi_1$ successively to a data signal that is input to each of the antenna elements of the equally spaced linear array antenna.

In order to so arrange it that the phase reference point of the first and second reference signals shifts by an amount equivalent to the interval between antenna elements of the equally spaced linear array antenna, (1) a prescribed phase difference is successively applied to the first reference signal and the resultant signals are input to the equally spaced linear array antenna from a first antenna element thereof to an (n−1)th antenna element thereof in succession; and (2) the prescribed phase difference is successively applied to the second reference signal and the resultant signals are input to the equally spaced linear array antenna from a second antenna element thereof to an nth antenna element thereof in succession.

If the above-described arrangement is adopted, reference signals for direction measurement can be emitted from an equally spaced linear array antenna for data transmission. This makes it unnecessary to separately provide an antenna for direction measurement. Further, the same signal can be generated in time-shared fashion and input to an equally spaced linear array antenna as the first and second reference signals, thereby making it possible to simplify the construction of the apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

DESCRIPTION OF THE PREFERRED EMBODIMENTS (A) Principle and Overview of the Present Invention (a) Principle FIGS. 1A to 1C are diagrams useful in describing the principle of the present invention, in which FIG. 1A is a diagram showing the relationship between the direction $\theta$ of a mobile station and the phases of received signals at the mobile station, FIG. 1B is a diagram useful in describing the path difference of each radio wave when radio waves are emitted in the direction θ from two antennas disposed with a distance D between them, and FIG. 1C is a diagram showing the relationship between a phase difference φ between two signals received by the mobile station and the direction θ of the mobile station as seen from the base station.

Figure 1A:
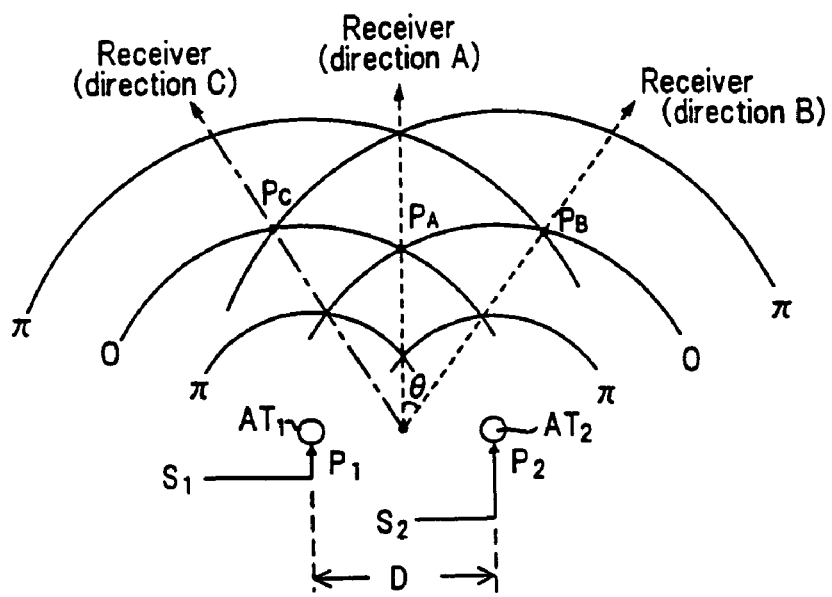
FIGS. 1A to 1C are diagrams useful in describing the principle of the present invention.

A radio base station transmits two signals $S_1$, $S_2$ from antennas $AT_1$, $AT_2$, respectively, placed at two points $P_1$, $P_2$, respectively, spaced apart by the distance D, as shown in FIG. 1A. If the receiver (mobile station) is present at any point $P_A$ in the A direction, the radio waves emitted from the respective antennas arrive at the receiver at point $P_A$ simultaneously. As a consequence, there is no phase difference between the received signals from the antennas (φ=0).

If the mobile station is present at any point $P_B$ in the B direction, on the other hand, the distance from the first point $P_1$ to the point $P_B$ will be greater than the distance from the second point $P_2$ to the point $P_B$. As a consequence, the radio waves from the antenna $AT_1$ placed at the first point arrive at the receiver of the mobile station later than the radio waves from the antenna $AT_2$ placed at the second point $P_2$, as a result of which a phase difference φ (>0) is produced. Similarly, if the mobile station is present at any point $P_C$ in the C direction, on the other hand, the distance from the first point $P_1$ to the point $P_C$ will be less than the distance from the second point $P_2$ to the point $P_C$. As a consequence, the radio waves from the antenna $AT_1$ placed at the first point arrive at the receiver of the mobile station earlier than the radio waves from the antenna $AT_2$ placed at the second point $P_2$, as a result of which a phase difference φ (<0) is produced. The magnitude of the phase difference φ has 1:1 correspondence to the difference (path difference) between the distance from the first point $P_1$ to the receiver of the mobile station and the distance from the second point $P_2$ to the receiver of the mobile station.

Figure 1B:
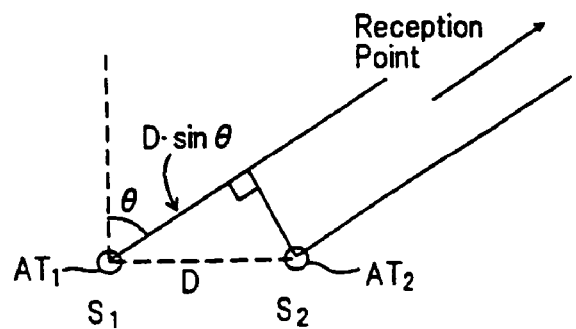
Figure 1C:
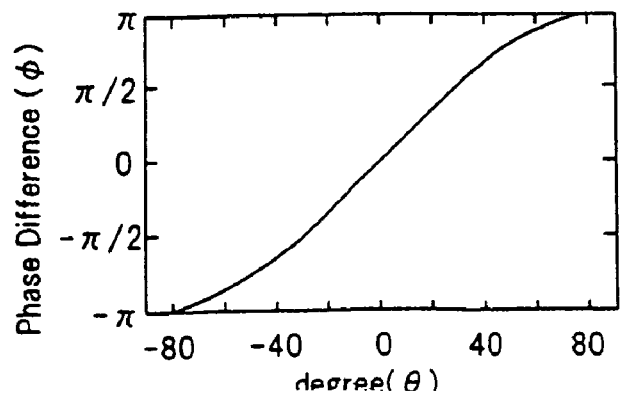

More specifically, if two waves transmitted from different points $P_1$, $P_2$ are received, as shown in FIG. 1B, a path difference D·sin θ is produced between the two waves owing to the direction θ of the point of reception (the receiver of the mobile station). Here D represents the difference between the two points of transmission and θ represents the direction of the reception point as an angle which the vertical direction serving as a reference forms with the direction of a straight line connecting the two transmission points. Owing to this path difference, a phase difference indicated by $$\phi = kD \sin \theta \quad (1)$$

is produced between the two received waves, where k=2π/λ and λ represents the wavelength of the radio waves. For example, if D is selected such that D=λ/2 holds, we have φ=π·sin θ and the phase difference between the two received signals becomes as shown in FIG. 1C. The phase difference φ and the direction θ have a 1:1 relationship and θ=sin⁻¹(φ/π) holds. Accordingly, the receiver of the mobile station is capable of calculating the direction θ of the reception point by measuring the phase difference φ between the two signals. If the direction θ of the reception point is fed back to the side of the transmitter, the transmitter of the base station can transmit data in this direction. This makes it possible to reduce transmission power and, moreover, to reduce interference applied to other mobile stations.

(b) Signal Separating Method

The two signals $S_1$, $S_2$ sent from the base station are received by the receiver of the mobile station in superimposed form. As a result, it is necessary that the signals $S_1$, $S_2$ be separated from each other. In other words, it is necessary to transmit the signals $S_1$, $S_2$ in such a manner that the receiver can separate them from the superimposed signals. There are two methods of achieving this.

According to a first method, the base station transmits, as the first and second signals $S_1$, $S_2$, signals obtained by spreading direction-measurement data using mutually orthogonal spreading codes $C_1(t)$, $C_2(t)$, and the receiver of the mobile station separates the first and second signals $S_1$, $S_2$ by applying despread processing to received data using codes $C_1(t)$, $C_2(t)$ identical with the spreading codes.

According to a second method, the same signal is transmitted alternately from two antennas by time division, thereby obtaining the first and second signals. Even if one signal is transmitted as the first and second signals from antennas at different points upon being divided in terms of time, as in the second method, the signals are related just as described in FIGS. 1A to 1C and it is possible to determine the direction (angle) θ of the reception point from the phase difference φ.

(c) Reporting Phase or Phase Difference φ

The calculation θ=sin⁻¹(φ/π) for obtaining the direction of the reception point (receiver of the mobile station) need not necessarily be performed on the side of the receiver. This calculation can be carried out on the side of the transmitter by feeding back the measured phase or phase difference. By obtaining the direction of the reception point on the transmitter side and transmitting data destined for the receiver from a directional antenna in the direction that has been obtained, interference imposed upon other mobile stations can be reduced and the circuit arrangement on the receiver side can be simplified.

(d) Use of Equally Spaced Linear Array Antenna

Figure 2:
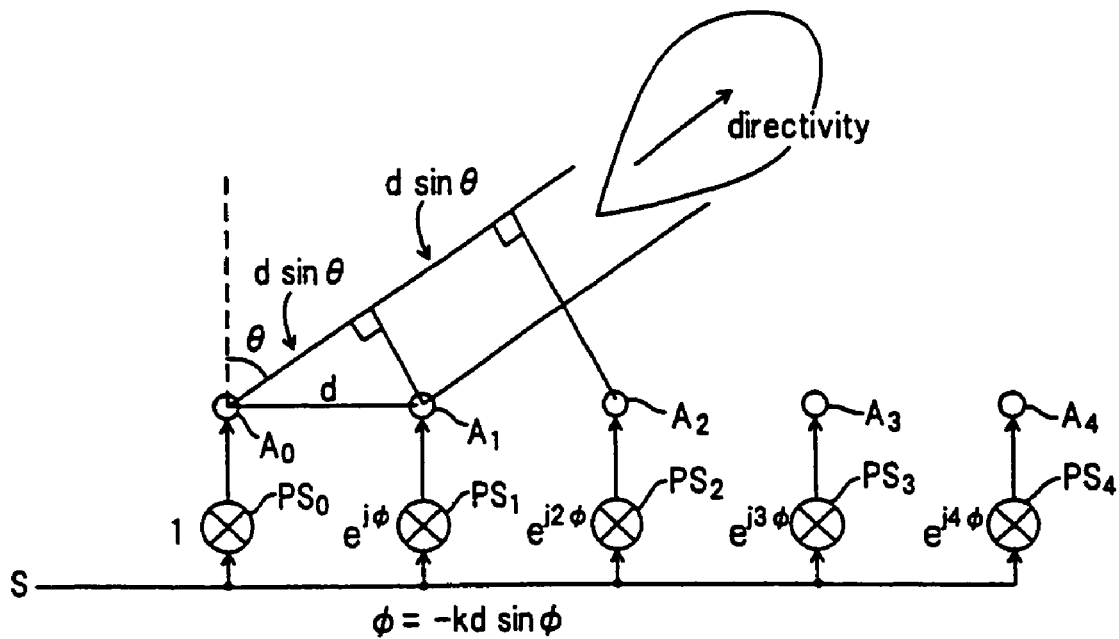
FIG. 2 is a diagram useful in describing the directivity of an equally spaced linear array antenna.

The base station uses an equally spaced linear array antenna as the directional antenna. The equally spaced, linear array antenna is an array antenna in which antenna elements $A_0$ to $A_m$ (m=4) are arrayed linearly at a uniform spacing d, as depicted in FIG. 2. If shifters $PS_0$ to $PS_m$ (m=4) apply a phase difference φ=kd sin θ (where k=2π/λ) successively to an input signal S and current is fed to the antenna elements $A_0$ to $A_m$, directivity is produced in the direction θ. Accordingly, if the base station uses an equally spaced linear array antenna as the antenna for data transmission, the base station finds the phase difference φ in accordance with the following equation $$\phi = -kd \sin \theta \quad (2)$$

using the measured direction θ, applies the phase difference to the input signal S successively in steps of φ (0, φ, 2φ, 3φ, . . . ), feeds current to the antenna elements $A_0$ to $A_m$ and transmits data in the direction of the receiver upon providing the data with directivity θ.

(e) Simplification of Direction Computation

In a case where the base station uses an equally spaced linear array antenna as the antenna for data transmission, the spacing of the antennas which radiate the first and second signals $S_1$ and $S_2$ is made equal to the antenna element spacing d of the equally spaced linear array antenna. If this arrangement is adopted, the phase difference p detected by the receiver will be as follows from Equation (1):

$$\phi = kD\sin\theta$$
$$= kd\sin\theta$$

If this is compared with Equation (2) above, it will be understood that this phase difference φ differs only in terms of sign from the phase difference found on the side of the base station. Accordingly, the receiver need only send the phase difference φ between the first and second signals to the base station. If the base station then applies the phase difference to the data signal S successively in steps of −φ and feeds current to the antenna elements $A_0$ to $A_m$ of the equally spaced linear array antenna, the directivity θ will be imposed upon the data and the data can be transmitted in the direction of the receiver. As a result, the calculation of the direction θ can be abbreviated, the computation load reduced and the construction of the apparatus simplified.

(f) Eliminating Antenna which Radiates First and Second Signals $S_1$, $S_2$

When the base station uses an equally spaced linear array antenna LAA as an antenna for data transmission, it is so arranged that first and second signals $S_1$, $S_2$ are emitted from this equally spaced linear array antenna, thereby making it possible to eliminate an antenna for direction measurement.

Figure 3A:
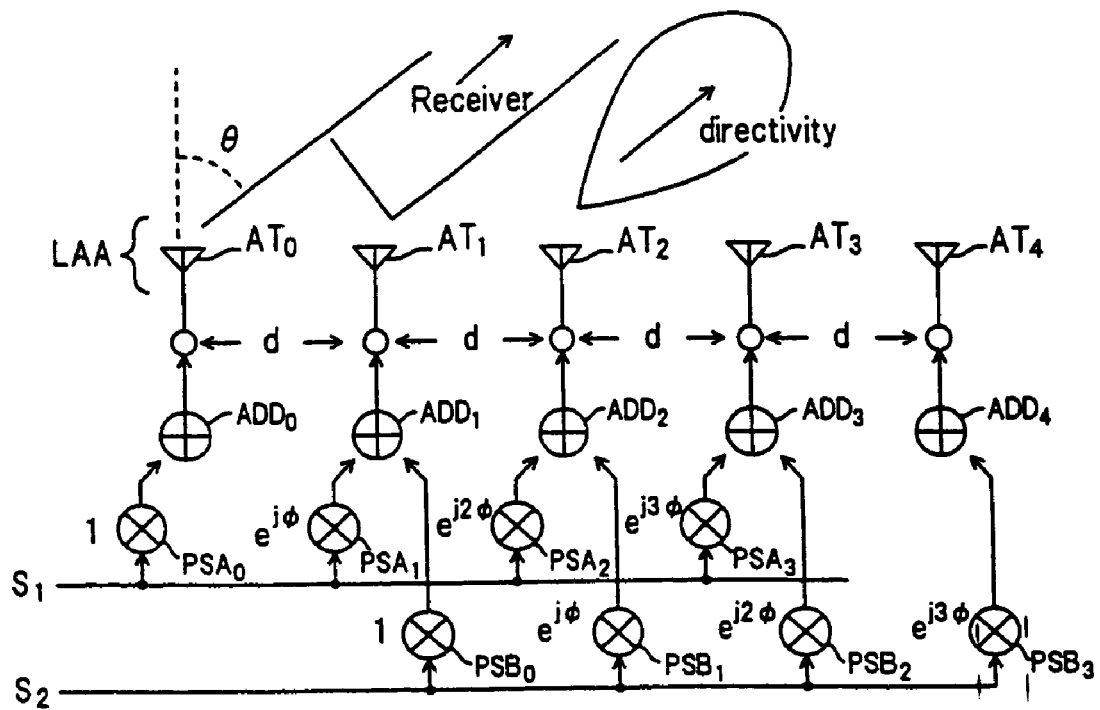
FIGS. 3A, 3B are diagrams useful in describing the principle of the present invention in which an antenna for transmitting a direction-measurement signal is eliminated.

More specifically, as shown in FIG. 3A, shifters $PSA_0$ to $PSA_{m-1}$ (m=4) delay the phase of signal $S_1$ successively by 0, φ, 2φ, 3φ, . . . , (m−1)φ, respectively, and input the delayed signals to antenna elements $AT_0$ to $At_{m-1}$, respectively, of the equally spaced linear array antenna via combiners $ADD_0$ to $AAD_{m-1}$ (m=4), respectively. Further, shifters $PSB_0$ to $PSB_{m-1}$ (m=4) delay the phase of the other signal $S_2$ successively by 0, φ, 2φ, 3φ, . . . , (m−1)φ, respectively, so as to shift the signal $S_1$ and phase reference point by the antenna element spacing of the equally spaced linear array antenna, and input the delayed signals to antenna elements $AT_1$ to $AT_m$ via combiners $ADD_1$ to $AAD_m$ (m=4).

If current is fed to the antenna elements of the equally spaced linear array antenna in the manner set forth above, it will be just as if first and second reference signals $$S_1' = S_1[1+\exp(j\phi)+\exp(2j\phi)+\exp(3j\phi)]$$

$$S_2' = S_2[1+\exp(j\phi)+\exp(2j\phi)+\exp(3j\phi)]$$

had been emitted from two antennas having a spacing d between them. However, the phase difference between the first and second reference signals received from the base station by the mobile station in the direction $\theta_1$ is $\phi_1$. That is, $\phi_1$ is the phase difference between the signals received by the mobile station in the direction $\theta_1$ from two antennas spaced apart by the distance d.

Accordingly, if the receiver of the mobile station feeds the phase difference $\phi_1$ back to the base station and the base station supplies current to the antenna elements $AT_0$ to $AT_{m-1}$ of the equally spaced linear array antenna upon delaying the phase of the data signal S successively by 0, $\phi_1$, $2\phi_1$, $3\phi_1$, . . . , (m−1)$\phi_1$, the base station can transmit a signal to the receiver upon applying the directivity $\theta_1$. By virtue of the foregoing, calculation of the direction θ can be eliminated, computation load can be alleviated and an antenna for measurement of direction can be eliminated.

(g) Multipath Environment

In a multipath environment, a receiver finds the path among multipaths along which a signal arrives earliest and calculates the phase difference θ between first and second signals that arrive via this path. If this arrangement is adopted, direction can be measurement accurately without the influence of radio waves that arrive because of reflection or scattering.

(B) First Embodiment (a) Overview

Figure 4:
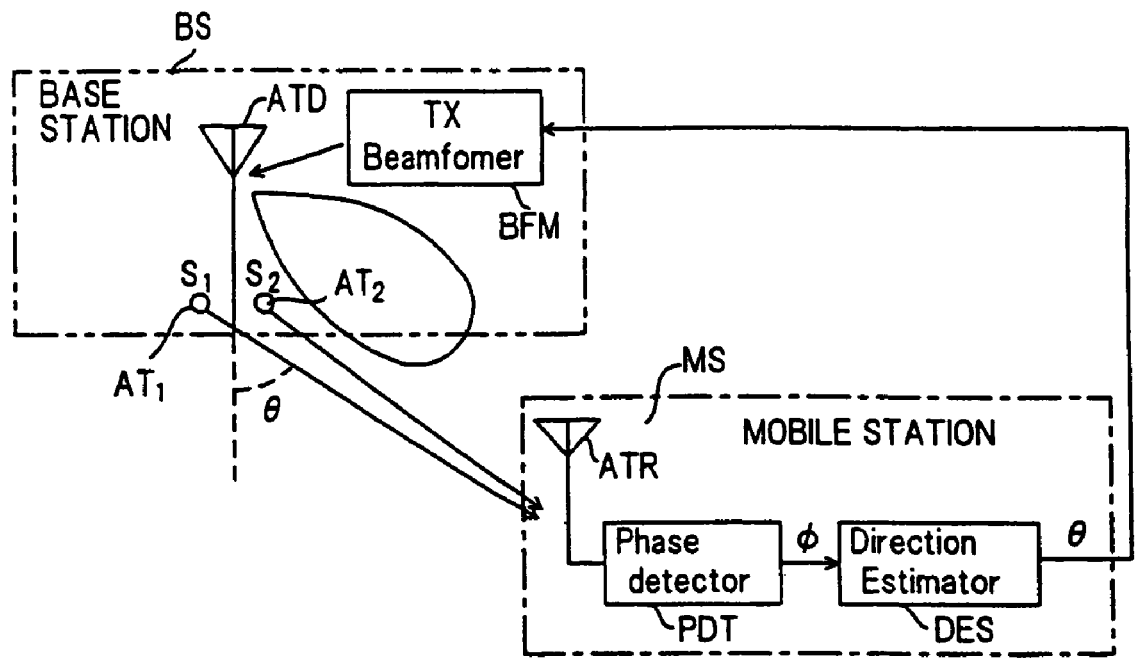
FIG. 4 is a diagram useful in describing an overview of a first embodiment of the present invention.

FIG. 4 is a diagram useful in describing an overview of the first embodiment of the present invention. Here BS represents a base station and MS a mobile station. The base station BS has two direction measuring antennas $AT_1$, $AT_2$ disposed at different positions having a spacing D between them and emits first and second reference signals $S_1$, $S_2$ obtained by spreading prescribed data using orthogonal spreading codes $C_1(t)$, $C_2(t)$. The base station BS further includes a transmit beamformer BFM and a directional antenna ATD, e.g., the equally spaced linear array antenna illustrated in FIG. 2. The transmit beamformer BFM executes beamforming processing to feed current to the directional antenna ATD, whereby the directional antenna ATD emits radio waves (a beam) in the direction of the mobile station MS.

The mobile station MS includes an antenna ATR; a phase detector PDT for receiving first and second reference signals $S_1$, $S_2$ transmitted from respective ones of the antennas $AT_1$, $AT_2$ and detecting the phase difference φ between these signals; and a direction estimator DES which, on the basis of the phase difference φ, estimates the direction θ of the mobile station MS as seen from the base station BS. Let D represent the spacing between the antennas $AT_1$, $AT_2$, and let θ represent the direction of the mobile station as seen from the base station. As described earlier with reference to FIG. 1 regarding the principle of the invention, a phase difference exists between first and second reference signals $S_1'$, $S_2'$ received and demodulated by the receiver of the mobile station MS. The phase detector PDT detects this phase difference φ (=kD sin θ) and the direction estimator DES performs the calculation $\theta = \sin^{-1}(\phi/kD)$ to estimate the direction θ of the mobile station MS as seen from the base station BS. The transmitter (not shown) of the mobile station MS subsequently transmits the signal representing the direction θ to the base station BS, and the transmit beamformer BFM in the transmitter of the base station BS applies beamforming in such a matter that radio waves will be emitted in the direction θ and feeds current to the directional antenna ATD. As a result, the directional antenna ATN emits radio waves (the beam) in the direction of the mobile station MS.

Figure 5:
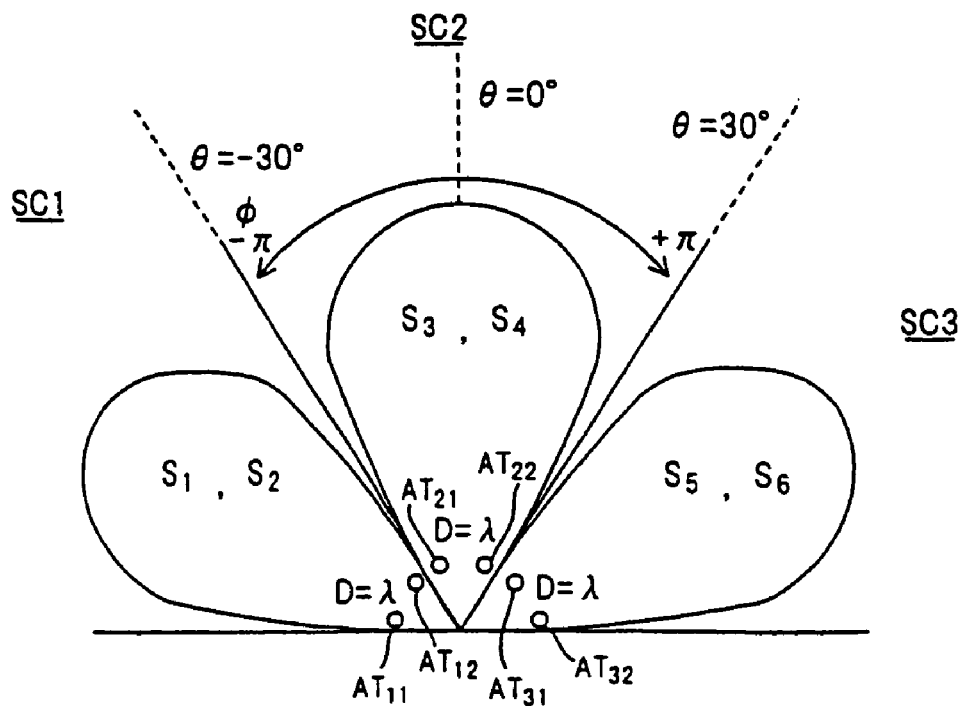
FIG. 5 is a diagram illustrating an example of implementation in which reference signals are transmitted by a directional antenna.

FIG. 5 is a diagram illustrating an example of implementation in which a reference signal is transmitted by a directional antenna. Here a range of 180° is divided up into three zones SC1 to SC3 of 60° each, the zones are provided with two antennas $AT_{11}$ and $AT_{12}$, $AT_{21}$ and $AT_{22}$, $AT_{31}$ and $AT_{32}$, respectively, and the two antennas of respective zones transmit reference signals $S_1$ and $S_2$, $S_3$ and $S_4$, $S_5$ and $S_6$, respectively, the beam width of which is 60°. In this case, the distance D between the antennas that transmit the two reference signals is selected in such a manner that the phase difference φ will be −π to +π when signals are received over a directivity range θ=−30° to +30°. The value of θ can be uniquely decided by making the selection in this manner. In the example of FIG. 5, if the phase reference points (antenna positions) from which the two reference signals are transmitted are spaced apart by the wavelength λ (D=λ) of the radio waves, the phase difference φ between two reference signals received by the mobile station in a range in which the distance θ satisfies the relation −30°≦θ≦+30° will be −π≦φ≦+π and θ can be found uniquely within these limits.

Figure 6:
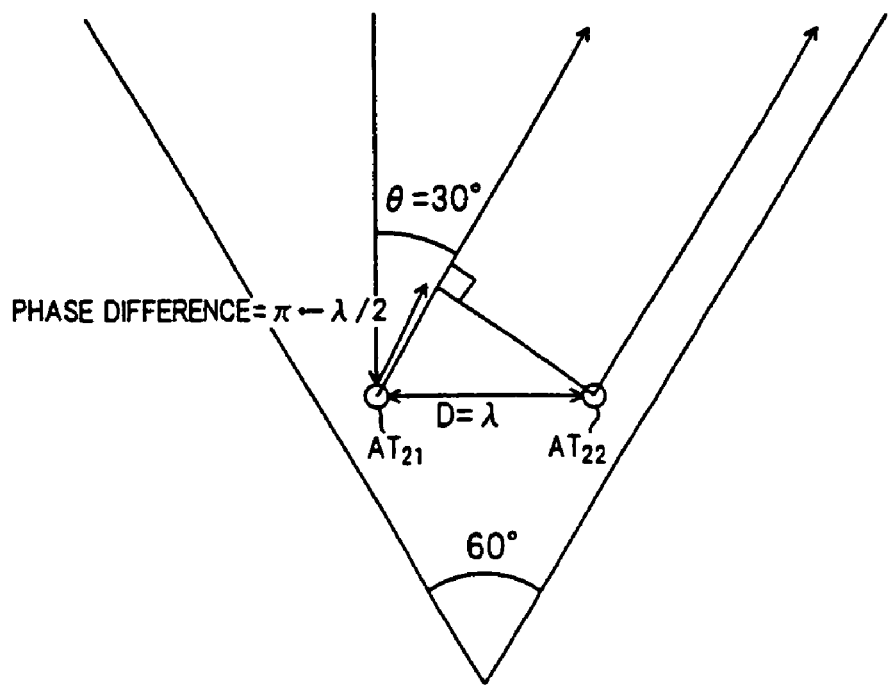
FIG. 6 is a diagram useful in describing the relationship between direction $\theta$ and phase difference $\phi$ of a directional antenna.

More specifically, if D=λ and θ=30° hold, as shown in FIG. 6, the path difference between two signals $S_3$, $S_4$ emitted from antennas $AT_{21}$, $AT_{22}$, respectively, will be λ/2.

If this path difference is converted to a phase difference, we have $(\lambda/2) \times (2\pi/\lambda) = \pi$. Similarly, if $D=\lambda$ and $\theta=-30°$ hold, the path difference between two signals $S_3$, $S_4$ emitted from antennas $AT_{21}$, $AT_{22}$, respectively, will be $-\lambda/2$. If this path difference is converted to a phase difference, we have $(-\lambda/2) \times (2\pi/\lambda) = -\pi$. This means that a direction $\theta$ of $-30°$ to $+30°$ corresponds to a phase difference $\phi$ of $-\pi$ to $+\pi$ between two reference signals received by the mobile station.

The base station BS transmits the first and second reference signals $S_1$ and $S_2$, $S_3$ and $S_4$, $S_5$ and $S_6$ from the directional antennas $AT_{11}$ and $AT_{12}$, $AT_{21}$ and $AT_{22}$, $AT_{31}$ and $AT_{32}$, respectively, shown in FIG. 5. The receiver of the mobile station selects signals having a strong reception power to thereby decide the zone (SC1 to SC3) in which these signals are being transmitted. This makes it possible to determine the reception position and the direction thereof. Furthermore, by measuring the phase difference $\phi$ in this zone, the direction $\theta$ can be measured accurately.

The foregoing describes a case where the mobile station calculates $\theta$ and feeds it back to the base station. However, it is also possible to adopt an arrangement in which the phases $\phi_1$, $\phi_2$ of first and second received signals $S_1'$, $S_2'$ or the phase difference $\phi$ ($=\phi_1-\phi_2$) between the signals $S_1'$, $S_2'$ are (is) fed back to the base station and the base station calculates $\theta$.

Further, the foregoing relates to a case where first and second signals $S_1$, $S_2$ obtained by spreading prescribed data using mutually orthogonal spreading codes $C_1(t)$, $C_2(t)$ are emitted from antennas $AT_1$, $AT_2$. However, the same signal can be applied to the antennas $AT_1$, $AT_2$ in time-shared fashion and transmitted as the first and second signals $S_1$, $S_2$.

(b) Construction of First Embodiment

Figure 7:
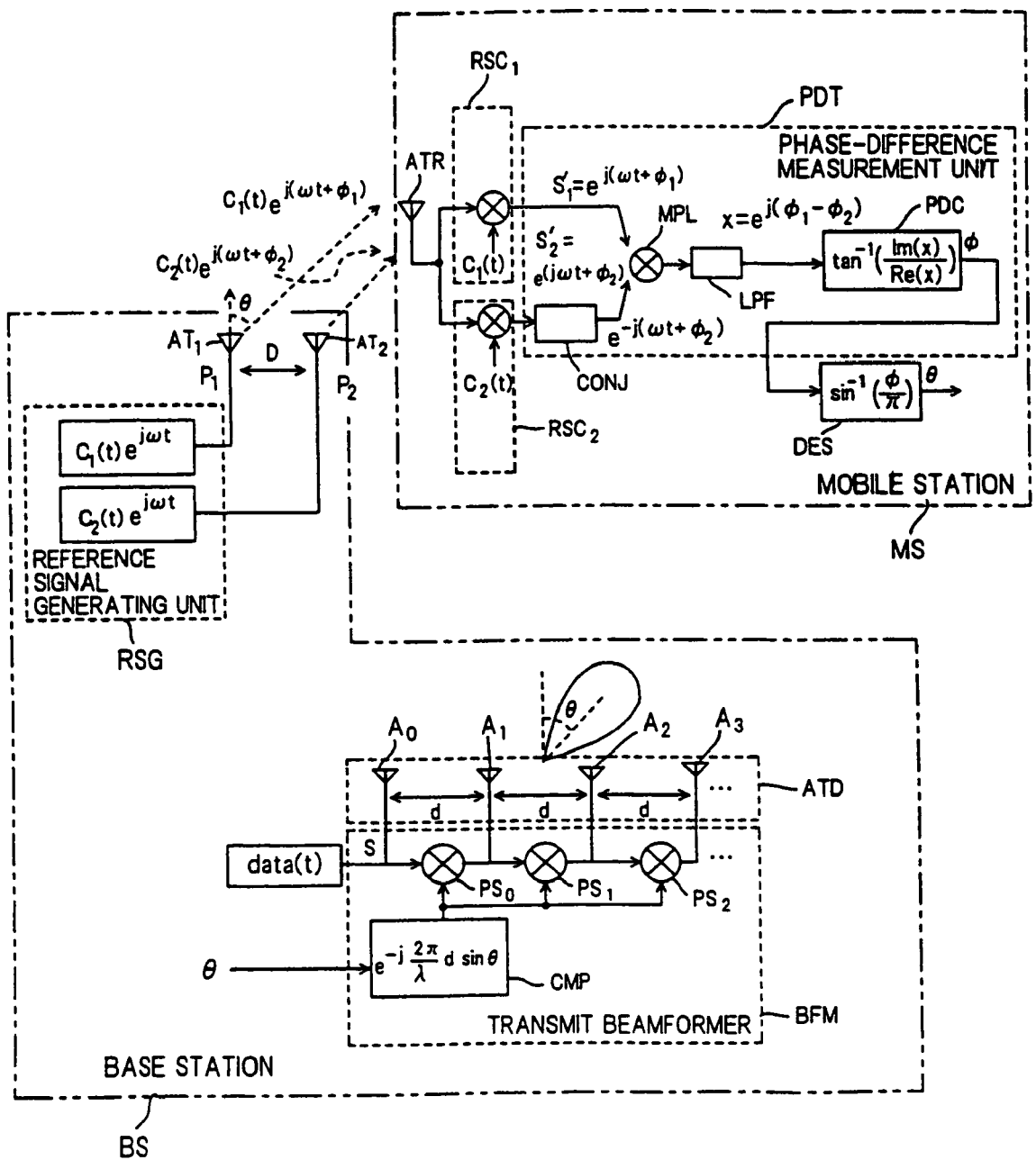
FIG. 7 is a diagram showing the construction of the first embodiment.

FIG. 7 is a diagram illustrating the construction of the first embodiment, in which components identical with those of FIG. 4 are designated by like reference characters. The base station BS has a reference signal generating unit RSG for generating two reference signals $S_1=C_1(t)e^{j\omega t}$, $S_2=C_2(t)e^{j\omega t}$. By way of example, the reference signal generating unit RSG converts a direction-measurement data sequence to two sequences I(t), Q(t), namely an in-phase component (also referred to as an "I component") and a quadrature component (also referred to as a "Q component"), multiplies (spreads) each of these by a spreading code $C_1(t)$, then applies QPSK quadrature modulation to generate a signal $C_1'(t)e^{j(\omega t+\beta)}$ ($\beta=0, \pm\pi/2, \pi$), similarly multiplies the two sequences of in-phase and quadrature components by a spreading code $C_2(t)$ and then applies QPSK quadrature modulation to generate a signal $C_2(t)e^{j(\omega t+\beta)}$ ($\beta=0, \pm\pi/2, \pi$). If $\beta=0$ holds, the first and second reference signals $S_1=C_1(t)e^{j\omega t}$, $S_2=C_2(t)e^{j\omega t}$ are obtained. It should be noted that $C_1(t)$, $C_2(t)$ employ spreading codes for which the cross-correlation value is 0, i.e., spreading codes which are orthogonally related as follows: $\int C_1(t)C_2(t)dt=0$.

These reference signal $S_1$, $S_2$ are frequency up-converted (IF→RF) and frequency amplified by a transmitting unit (not shown), the resultant signals are input to the antennas $AT_1$, $AT_2$, respectively, and the signals then radiate out into space.

Figure 8:
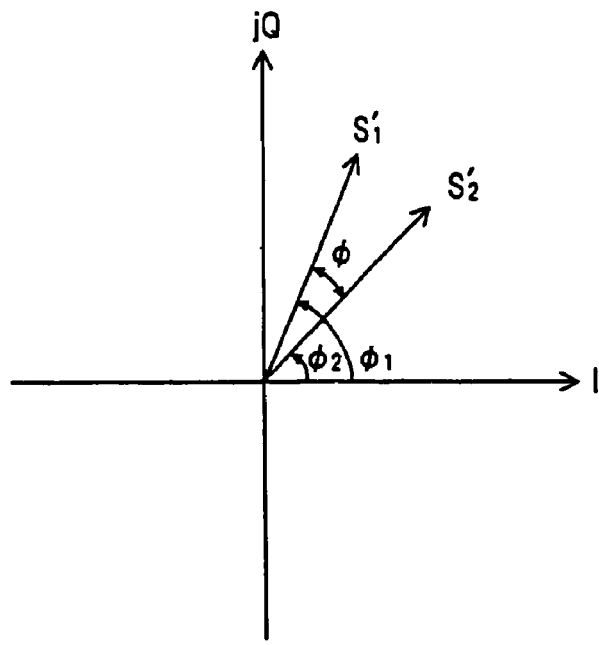
FIG. 8 is a vector representation of first and second reference signals $S_1'$, $S_2'$, which have been rotated in terms of phase, in an i-jQ complex plane.

The reference signals $S_1$, $S_2$ are received by the antenna ATR of the mobile station MS as signals that have been rotated in phase by $\phi_1$, $\phi_2$ owing to propagation delay, after which the signals are subjected to an RF‡IF frequency conversion and QPSK quadrature detection by a receiving unit (not shown). The resultant signals are input to despreaders $RSC_1$, $RSC_2$ for direction measurement. The despreaders $RSC_1$, $RSC_2$ multiply (despread) their input signals by the spreading codes $C_1(t)$, $C_2(t)$, respectively, and apply phase-rotated first and second signals $S_1'=e^{j(\omega t+\phi_1)}$, $S_2'=e^{j(\omega t+\phi_2)}$ to a phase-difference difference measurement unit PDT. The first and second signals $S_1'=e^{j(\omega t+\phi_1)}$, $S_2'=e^{j(\omega t+\phi_2)}$ are as illustrated in FIG. 8 when expressed as vectors in an I-jQ complex plane.

The phase-difference measurement unit PDT has a complex-conjugate calculation unit CONJ for outputting the complex conjugate $S_2'^*=e^{-j(\omega t+\phi_2)}$ of the signal $S_2'=e^{j(\omega t+\phi_2)}$, and a multiplier MPL for calculating $S_1' \cdot S_2'^*$. As a result, $x=e^{j(\phi_1-\phi_2)}$ is obtained from a low-pass filter LPF. A phase-difference calculation unit PDC calculates the phase difference $\phi$ in accordance with the equation $$\phi=\tan^{-1}[Im(x)/Re(x)] \qquad (3)$$

and inputs the phase difference to the direction estimator DES. Here Im(x) represents the imaginary part of x and Re(x) the real part of x.

The phase difference $\phi$ can be written $$\phi=kD \sin \theta$$

from Equation (1) and since $k=2\pi/\lambda$, $D=\lambda/2$ hold, the following equation holds:

$$\phi=\pi \sin \theta \qquad (4)$$

Accordingly, the direction estimator DES calculates and outputs the direction $\theta$ on the basis of the following equation:

$$\theta=\sin^{-1}(\phi/\pi) \qquad (5)$$

The transmitter (not shown) of the mobile station MS thenceforth transmits the signal representing the direction $\theta$ to the base station BS.

When the base station BS receives the direction $\theta$ from the mobile station, the base station inputs the direction $\theta$ to the transmit beamformer BFM. The latter has a calculation unit CMP which, on the basis of the following equation:

$$\Phi=kd \sin \theta$$

$$=-2\pi d \sin \theta/\lambda \qquad (6)$$

calculates the phase difference $\Phi$ of the signal input to each antenna element of the equally spaced linear array antenna ATD. Phase shifters $PS_0$ to $PS_n$ apply the phase differences $0, \Phi$ ($=-kd \sin \theta$), $2\Phi, 3\Phi, \ldots$) to the input signal (transmit signal) S successively and input the resultant signals to the antenna elements $A_0$ to $A_m$. As a result, the equally spaced linear array antenna ATD emits radio waves in the direction of $\theta$ and thus transmit data.

(c) Modification

Figure 9:
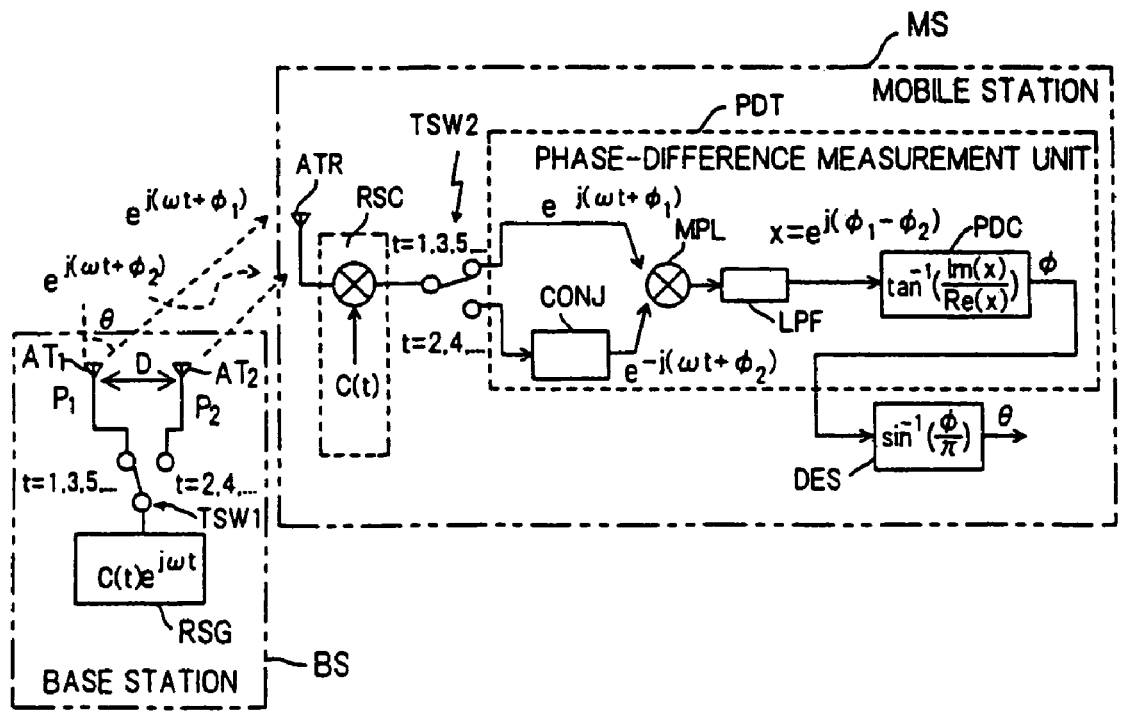
FIG. 9 is a diagram illustrating a modification of the first embodiment, in which the same signal is time-shared and transmitted.

FIG. 9 illustrates a modification of the first embodiment, in which the same signal is transmitted, in time-shared fashion, as first and second signals. Components in FIG. 9 identical with those shown in FIG. 7 are designated by like reference characters. Here the base station BS differs from that of FIG. 7 in the following respects:

(1) the reference signal generating unit RSG generates one reference signal $C(t)e^{j\omega t}$;

(2) a time share switch TSW1 is provided and inputs the reference signal to the first transmit antenna $AT_1$ in odd-numbered time slots $t=1, 3, 5, \ldots$ and to the second transmit antenna $AT_2$ in even-numbered time slots $t=2, 4, 6, \ldots$, whereby the reference signal is transmitted as the first and second reference signals $S_1$, $S_2$; and (3) the transmit beamformer BFM and equally spaced linear array antenna ATD are not illustrated.

The mobile station MS differs from that of FIG. 7 in the following respects:

(1) One despreader RSC is provided and outputs the first and second reference signals $S_1'$, $S_2'$ the phases whereof have been rotated by despreading; and (2) a time share switch TSW2 is provided and outputs, as the first reference signal $S_1'$, the signal delivered from the despreader RSC in odd-numbered time slots t=1, 3, 5, . . . and outputs, as the second reference signal $S_2'$, the signal delivered from the despreader RSC in even-numbered time slots t=2, 4, 6, . . . .

The reference signal generating unit RSG converts the direction-measurement data sequence to two sequences, namely the in-phase and quadrature components, multiplies each of these by a spreading code. C(t) to spread them, then applies QPSK quadrature modulation to the spread data to generate a baseband reference signal $S=C(t)e^{j\omega t}$. The time share switch TSW1 outputs the reference signal S as the first reference signal $S_1$ in odd-numbered time slots t=1, 3, 5, . . . and outputs the reference signal as the second reference signal $S_2$ in even-numbered time slots t=2, 4, 6, . . . . These reference signal $S_1$, $S_2$ are thenceforth frequency up-converted (IF→RF) and frequency amplified by a transmitting unit (not shown), the resultant signals are input to the antennas $AT_1$, $AT_2$, respectively, and the signals then radiate out into space.

The reference signals $S_1$, $S_2$ are received by the antenna ATR of the mobile station MS as signals that have been rotated in phase by $\phi_1$, $\phi_2$ owing to propagation delay, after which the signals are subjected to an RF→IF frequency conversion and QPSK quadrature detection by a receiving unit (not shown). The resultant signals are input to the despreader RSC. The latter multiplies (despreads) the input signals by the spreading code C(t). The time share switch TSW2 applies the despread signal to the phase-difference measurement unit PDT as the first reference signal $S_1''=e^{j(\omega t+\phi_1)}$ in odd-numbered time slots t=1, 3, 5, . . . and applies the despread signal to the phase-difference measurement unit PDT as the second reference signal $S_2'=e^{j(\omega t+\phi_2)}$ in even-numbered time slots t=2, 4, 6, . . . . The phase-difference measurement unit PDT and direction estimator DES operate as in FIG. 7 so that the direction θ is transmitted to the base station BS. The base station BS also operates as in FIG. 7 so that the input signal is transmitted in the direction θ upon being provided with directivity.

(d) Construction of Base Station (d-1) Construction of Transmitter

Figure 10:
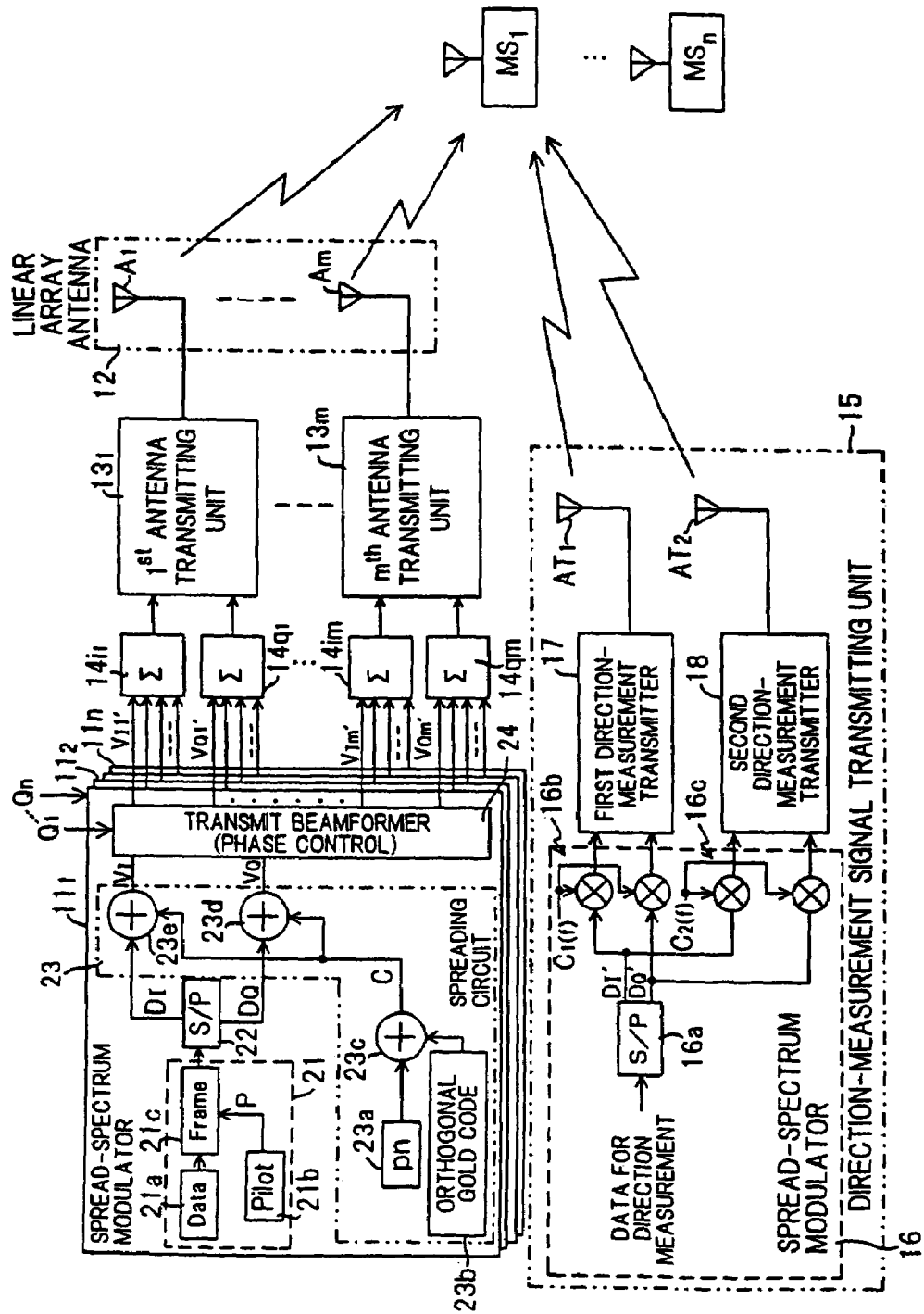
FIG. 10 is a diagram illustrating the construction of a CDMA transmitter of a base station.

FIG. 10 is a diagram illustrating the construction of a CDMA transmitter in a base station for code-multiplexing and transmitting n channels of transmit data. The transmitter includes spread-spectrum modulators $11_1$ to $11_n$ of $1^{st}$ to $n^{th}$ channels; an equally spaced linear array antenna 12 serving as an antenna for data transmission, the array antenna having antenna elements $A_1$ to $A_m$ uniformly spaced apart by a distance d; and transmitting units $13_1$ to $13_m$ for applying transmit signals to the antenna elements $A_1$ to $A_m$ of the equally spaced linear array antenna 12. Though not shown, each transmitting unit has a DA converter, a QPSK modulator, a frequency converter (IF→RF) and a high-frequency amplifier. Combiners $14i_1$, $14q_1$ respectively combine I, Q signals $V_{I1}'$, $V_{Q1}'$ output from the respective spread-spectrum modulators $11_1$ to $11_n$ of the respective channels and input to the first antenna element $A_1$, and combiners $14i_m$, $14q_m$ respectively combine I, Q signals $V_{Im}'$, $V_{Qm}'$ output from the spread-spectrum modulators $11_1$ to $11_n$ of the respective channels and input to the $m^{th}$ antenna element $A_m$. The apparatus further includes a signal transmitting unit 15 for direction measurement.

Each of the spread-spectrum modulators $11_1$ to $11_n$ has a frame generator 21, a serial/parallel (S/P) converter 22 for converting frame data to parallel data, a spreading circuit 23 and a transmit beamformer 24. The frame generator 21 has a transmit data generator 21a for generating serial transmit data D1, a pilot generator 21b for generating a pilot P, and a framing unit 21c for dividing the serial data D1 into blocks a prescribed number of bits at a time and inserting a pilot and other control data before and after every block to thereby form frames. The S/P converter 22 alternately distributes the frame data (the pilot signals and transmit data) one bit at a time to convert the frame data to I-component (in-phase component) data $D_I$ and Q-component (quadrature-component) data $D_Q$.

The spreading circuit 23 includes a pn sequence generator 23a for generating a pn sequence (long code) specific to the base station, an orthogonal Gold code generator 23b for generating an orthogonal Gold code (short code) for user identification, an EX-OR gate 23c for outputting a spreading code C by taking the exclusive-OR between the pn sequence and the Gold code, and EX-OR gates 23d, 23e for performing spread-spectrum modulation by taking the exclusive-ORs between the data $D_I$ and $D_Q$ of the two sequences, respectively, and the code C. It should be noted that since "1" is level −1 and "0" is level +1, the exclusive-OR between signals is the same as the product between them.

Figure 11:
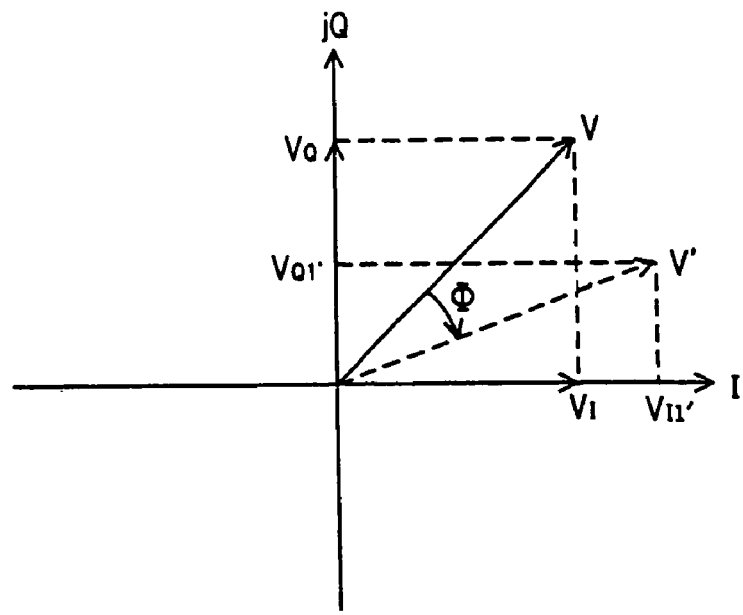
FIG. 11 is a diagram useful in describing phase rotation in beam forming.

The transmit beamformer 24 performs beamforming based upon the mobile-station direction $\theta_1$ reported from the user (mobile station). In order to emit the beam upon providing directivity in the direction $\theta_1$ in a case where the equally spaced linear array antenna 12 is used as the antenna for data transmission, it is necessary to find the phase difference Φ in accordance with the following equation:

$$\Phi = -kd \sin \theta_1$$

$$= -2\pi d \sin \theta_1 / \lambda \qquad (6)'$$

and to feed current upon applying the phase difference Φ successively to the input signal of each antenna element, as will be evident from the description of principles set forth earlier. Feeding current while applying the phase difference Φ successively to the input signal of each antenna element is equivalent to rotating, by Φ, the signal point position vector V of the spread-spectrum modulated signals $V_I$, $V_Q$ output from the spreading circuit 23, as shown in FIG. 11. Accordingly, using the following vector rotation equations:

$$V_{I1}' = V_I \cos \Phi - V_Q \sin \Phi$$

$$V_{Q1}' = V_I \sin \Phi + V_Q \cos \Phi$$

the transmit beamformer 24 calculates the signal input to the first antenna element $A_1$ and outputs the calculated signal. Specifically, I, Q components $V_{I1}'$, $V_{Q1}'$ of a position vector V' obtained by rotating the signal point position vector V by Φ are output as the input signal of the first antenna element.

Similarly, using the following vector rotation equations:

$$V_{Ij}' = V_I \cos \Phi_j - V_Q \sin \Phi_j$$

$$V_{Qj}' = V_I \sin \Phi_j + V_Q \cos \Phi_j$$

the transmit beamformer 24 calculates the signal input to the $j^{th}$ antenna element $A_j$ and outputs the calculated signal.

By applying the above-mentioned signals to the $1^{st}$ to $m^{th}$ antenna elements $A_1$ to $A_m$, the data of the first channel can be emitted with directivity in the direction of the mobile station of the first channel user the direction of which is $\theta_1$. The spread-spectrum modulators $11_1$ to $11_n$ of the respective channels operate in a similar manner so that the signal of each channel can be emitted with directivity in the direction of the mobile station that corresponds to the channel.

The combiner $14i_1$ combines the I-signal components $V_{I1}'$ input from each of the channels to the first antenna element $A_1$, and the combiner $14q_1$ combines the Q-signal components $V_{Q1}'$ input from each of the channels to the first antenna element $A_1$. Each of these combined signals is input to the first antenna transmitting unit $13_1$. Similarly, the combiner $14i_j$ (j=1 to m) combines the I-signal components $V_{Ij}'$ input from each of the channels to the $j^{th}$ antenna element $A_j$, and the combiner $14q_j$ combines the Q-signal components $V_{Qj}'$ input from each of the channels to the $j^{th}$ antenna element $A_j$. Each of these combined signals is input to the $j^{th}$ antenna transmitting unit $13j$.

The transmitting units $13_1$ to $13_m$ apply QPSK quadrature modulation to the input signals, convert the obtained baseband signals to high-frequency signals, apply high-frequency amplification and input the resultant signals to the antenna elements $A_1$ to $A_m$ of the equally spaced linear array antenna 12. The signal transmitting unit 15 for direction measurement transmits the two reference signals $S_1=C_1(t)e^{j\omega t}$, $S_2=C_2(t)e^{j\omega t}$ to from the antenna $AT_1$, $AT_2$. More specifically, an S/P converter 16a of the control signal generator 16 alternately distributes a direction-measurement data sequence one bit at a time to convert the data to in-phase component and quadrature-component data sequences $D_I'$, $D_Q'$, and a first despreader 16b multiplies the sequences $D_I'$, $D_Q'$ by the spreading code $C_1(t)$ to spread the same and input the resultant signals to a first direction-measurement transmitting unit 17. Further, a second spreader 16c multiplies the sequences $D_I'$, $D_Q'$ by the spreading code $C_2(t)$ to spread the same and input the resultant signals to a second direction-measurement transmitting unit 18. The first and second direction-measurement transmitting units 17, 18 apply QPSK quadrature modulation to their input signals to generate the baseband first and second reference signals $S_1=C_1(t)e^{j\omega t}$, $S_2=C_2(t)e^{j\omega t}$, up-convert the baseband signals to high-frequency signals, apply high-frequency modulation and input the amplified signals to the antennas $AT_1$, $AT_2$ for direction measurement. Mobile stations $MS_1$ to $MS_n$ receive the direction-measurement signals emitted from the antennas $AT_1$, $AT_2$, calculate the directions $\theta_1$ to $\theta_n$ of the mobile stations as seen from the base station and feed these directions back to the base station.

(d-2) Construction of Receiver

Figure 12:
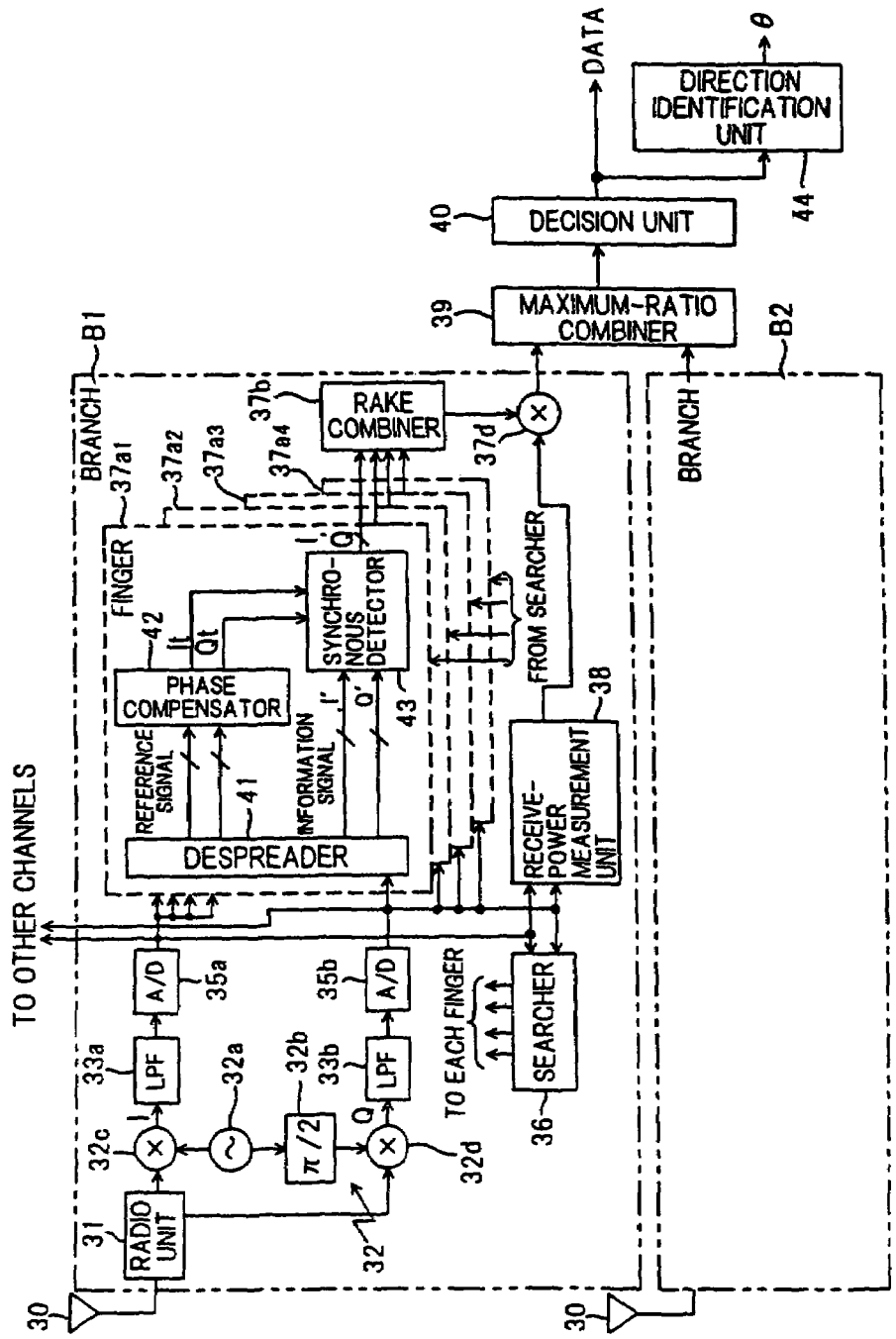
FIG. 12 is a diagram illustrating the construction of a receiver at a base station.

FIG. 12 illustrates an example of the construction of one channel of a base-station CDMA receiver. This receiver has a diversity structure in which the output from each branch is subjected to maximum-ratio combining and data is judged based upon the results of such combining. A radio unit 31 of a branch B1 (or B2) frequency-converts a high-frequency signal received by an antenna 30 to an intermediate-frequency signal (i.e., executes an RF-to-IF conversion). A quadrature detector 32 subjects the IF signal to quadrature detection and outputs in-phase component (I-component) data and quadrature component (Q-component) data. The quadrature detector 32 has a receive carrier generator 32a, a phase shifter 32b for shifting the phase of a receive carrier by $\pi/2$, and multipliers 32c, 32d for multiplying the baseband signal by the receive carrier and outputting I- and Q-component signals, respectively. Low-pass filters (LPF) 33a, 33b limit the band of the output signals and AD converters 35a, 35b convert the I- and Q-component signals, respectively, to digital signals and input these digital signals to a searcher 36, fingers $37a_1$ to $37a_4$ and a receive-power measurement unit 38.

When a direct-sequence signal (DS) signal that has been influenced by multipath enters the searcher 36, the latter detects multipath by performing an autocorrelation operation using a matched filter and inputs despreading-start timing data and delay-time adjustment data of each path to the fingers $37a_1$ to $37a_4$. A despread/delay-time adjustment unit 41 of each finger performs dump integration by subjecting a direct wave or a delayed wave that arrives via a prescribed path to despread processing using a code identical with the spreading code, and for subsequently applying delay processing that conforms to the path and outputting a pilot signal (reference signal) and an information signal. A phase compensator (channel estimation unit) 42 averages voltages of the I and Q components of the pilot signal over a prescribed number of slots and outputs channel estimation signals It, Qt. A synchronous detector 43 restores the phases of despread information signals I', Q' to the original phases based upon a phase difference $\theta$ between a pilot signal contained in a receive signal and an already existing pilot signal. More specifically, the channel estimation signals It, Qt are cosine and sine components of the phase difference $\theta$, and therefore the synchronous detector 43 demodulates the receive information signal (I,Q) (performs coherent detection) by applying phase rotation processing to the receive information signal (I',Q') in accordance with the following equation using the channel estimation signal (It,Qt):

$$\begin{pmatrix} I \\ Q \end{pmatrix} = \begin{pmatrix} It & Qt \\ -Qt & It \end{pmatrix} \begin{pmatrix} I' \\ Q' \end{pmatrix}$$

A rake combiner 37b combines signals output from the fingers $37a_1$–$37a_4$, and a multiplier 37d multiplies the output of the RAKE combiner by a weight conforming to reception power and outputs the product. A maximum-ratio combiner 39 combines the outputs of the branches at a ratio that conforms to the magnitude of reception power, and a decision unit 40 judges the data based upon the output of the maximum-ratio combiner 39. A direction identification unit 44 identifies the direction $\theta$ sent from the mobile station and inputs the identified direction to the corresponding spread-spectrum modulator 11i of the transmitter (FIG. 10).

(e) Construction of Mobile Station

Figure 13:
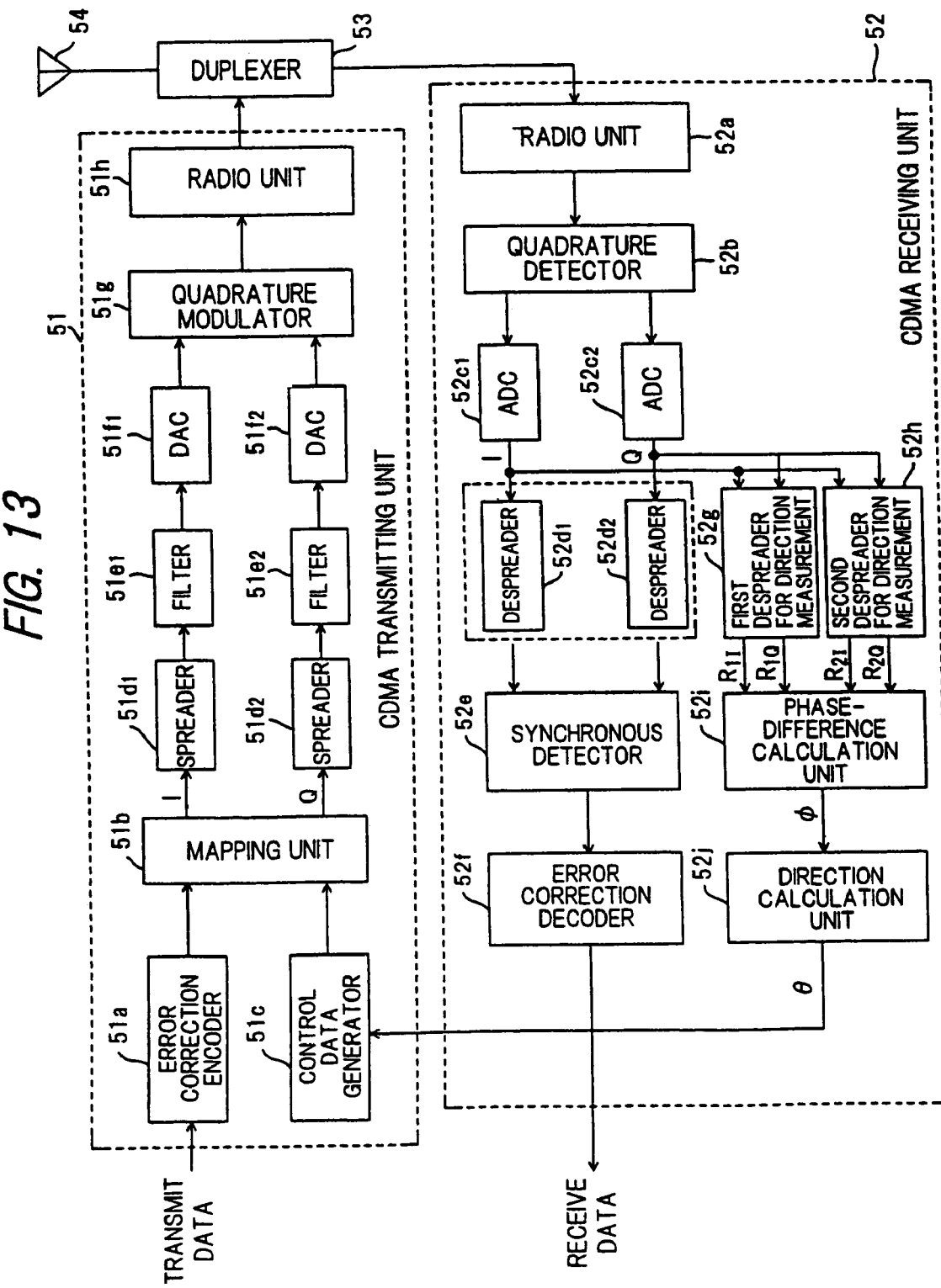
FIG. 13 is a diagram illustrating the construction of a mobile station.

FIG. 13 is a diagram showing the construction of a CDMA transceiver in a mobile station. The transceiver includes a CDMA transmitting unit 51, a CDMA receiving unit 52, a duplexer 53 and a transceiving antenna 54.

The transmitting unit 51 includes an error correction encoder 51a for subjecting transmit data to error correction encoding processing and applying the resultant signal to a mapping unit 51b. Further, a control data generator 51c generates control data such as a pilot and inputs the control data to the mapping unit 51b. The mapping unit 51b outputs the encoded data sequence from the error correction encoder 51a as a quadrature-modulated in-phase component at a predetermined symbol rate and outputs the control data sequence, which includes the pilot, as a quadrature component at a fixed symbol rate. Spreaders $51d_1$, $51d_2$ subject the in-phase component (I component) and quadrature component (Q component) to spread-spectrum modulation using predetermined spreading codes and input the spread data to DA converters $51f_1$, $51f_2$ via filters $51e_1$, $51e_2$ for shaping the waveforms. A quadrature modulator $51g$ applies QPSK quadrature modulation to I- and Q-channel signals output from the DA converters, and a radio unit $51h$ converts the baseband signal output from the quadrature modulator $51g$ to a high-frequency signal (i.e., executes a IF-to-RF conversion), applies high-frequency amplification and transmits the amplified signal from the antenna 54.

The CDMA receiver 52 has a radio unit 52a for amplifying a high-frequency signal received by the antenna 30 and frequency-converting the amplified signal to an intermediate-frequency signal (i.e., for executing an RF-to-IF conversion). A quadrature detector 52b demodulates I- and Q-channel signals by quadrature detection and inputs the demodulated signals to AD converters $52c_1$, $52c_2$. Despreaders $52d_1$, $52d_2$ multiply the outputs of the DA converters by codes identical with the spreading codes of the base station to thereby despread the converter outputs, and a coherent detector discriminates the received data by coherent detection. An error correction decoder 52f subjects the received data to error correction decoding processing and outputs the result. The foregoing is an arrangement for receiving ordinary communication data. However, the receiving unit includes also an arrangement for receiving direction-measurement data sent from the base station.

Figure 14:
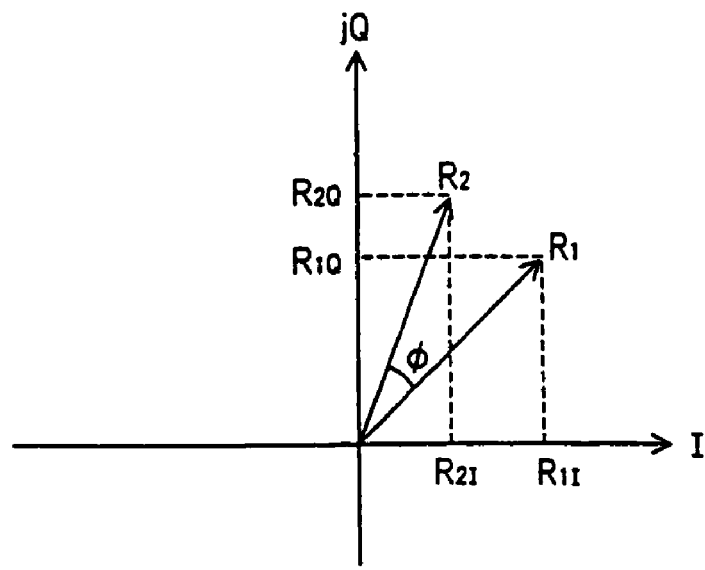
FIG. 14 is a diagram useful in describing signal point position vectors of data (symbols) for phase measurement at a mobile station.

A first despreader 52g for direction measurement performs despreading by multiplying the outputs of the AD converters $52c_1$, $52c_2$ by the spreading code $C_1(t)$ and outputs a signal point position vector $R_1$ ($R_{1I}$, $R_{1Q}$) (see FIG. 14). A second despreader 52h for direction measurement performs despreading by multiplying the outputs of the AD converters $52c_1$, $52c_2$ by the spreading code $C_2(t)$ and outputs a signal point position vector $R_2$ ($R_{2I}$, $R_{2Q}$). The spreading codes $C_1(t)$, $C_2(t)$ are codes identical with the mutually orthogonal spreading codes by which the base station multiplies the direction-measurement data in order to spread this data.

Using the signal point position vectors $R_1$, $R_2$, a phase-difference calculation unit 52i calculates the phase difference $\phi$ of each vector, and a direction calculation unit 52j calculates the direction $\theta$ of the mobile station, as seen from the base station, in accordance with the following equation:

$$\theta = \sin^{-1}(\phi/\pi) \quad (5)$$

and inputs the direction $\theta$ to the control data generator 51c of the transmitting unit 51c. The CDMA transmitter 51 transmits the direction $\theta$ to the base station as control data.

(C) Second Embodiment

Figure 15:
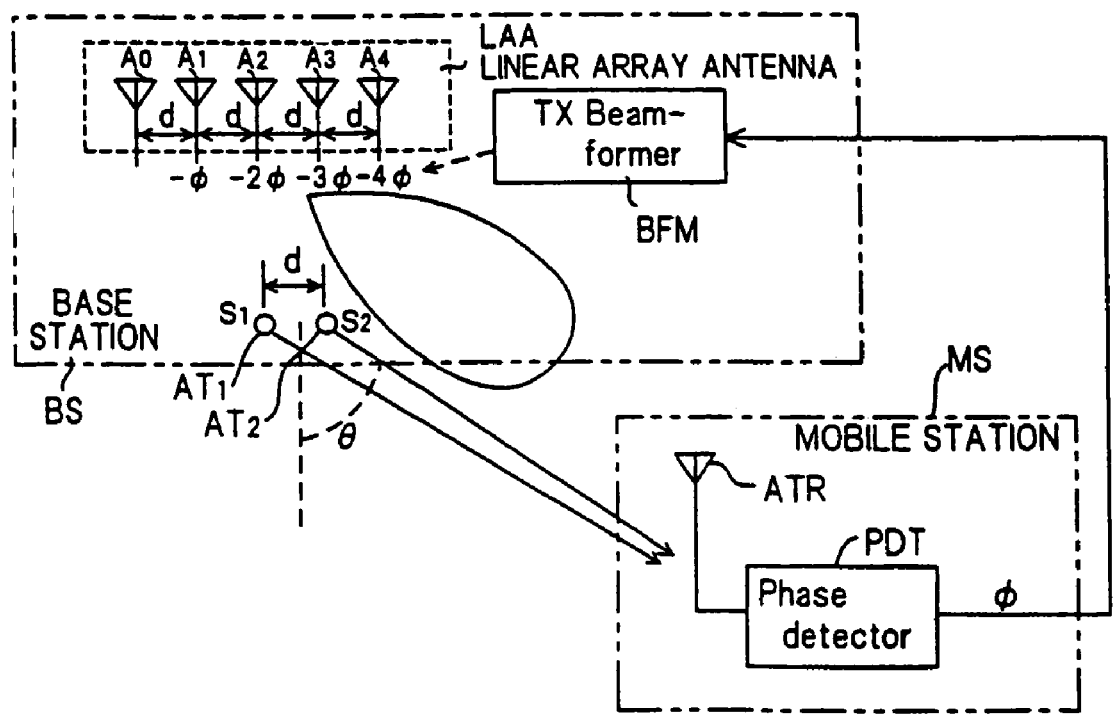
FIG. 15 is a diagram useful in describing an overview of a second embodiment of the present invention.

FIG. 15 is a diagram useful in describing an overview of a second embodiment according to the present invention. Components identical with those of the first embodiment shown in FIG. 4 are designated by like reference characters. This embodiment differs in the following respects:

(1) the equally spaced linear array antenna LAA is used as the directional antenna for data communication;

(2) the distance D between the antennas $AT_1$, $AT_2$ for direction measurement is made equal to the spacing d of the antenna elements of the equally spaced linear array antenna LAA (D=d);

(3) the direction estimator DES is removed from the mobile station MS and the phase difference $\phi$ is fed back from the mobile station to the base station; and (4) the transmit beamformer BFM applies the phase difference successively in steps of $\Phi$ to the data signal directed to the mobile station and feeds current to the antenna elements $A_0$ to $A_m$ of the equally spaced linear array antenna LAA.

In a case where the base station uses the equally spaced linear array antenna LAA as the antenna for data transmission, the spacing D between the antennas $AT_1$, $AT_2$ that emit the first and second reference signal $S_1$, $S_2$ is made equal to the spacing d between the antenna elements of the equally spaced linear array antenna LAA. If this arrangement is adopted, the mobile station need only feed back the phase difference $\phi$ between the first and second reference signals to the base station BS. Further, if the transmit beamformer BFM of the base station BS applies phase differences 0, $\phi$, $2\phi$, $3\phi$, $4\phi$, ... to the data signal S successively and feeds current to the antenna elements $A_0$ to $A_m$ of the equally spaced linear array antenna, the directivity $\theta$ will be imposed upon the data and the data can be transmitted in the direction of the receiver.

Figure 16:
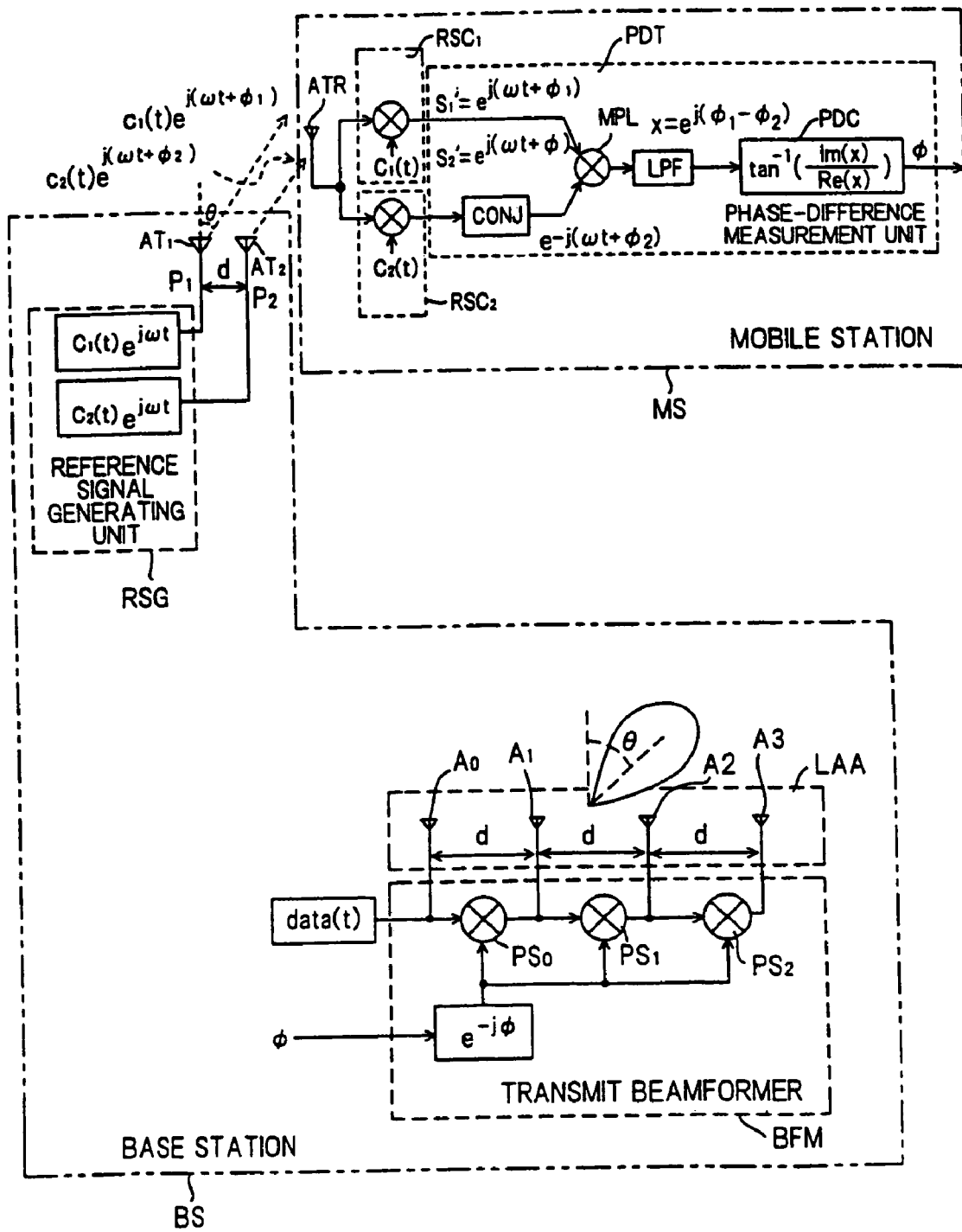
FIG. 16 is a diagram illustrating the construction of the second embodiment.

FIG. 16 is a diagram illustrating the construction of the second embodiment, in which components identical with those shown in FIG. 7 are designated by like reference characters. This arrangement differs from that of FIG. 7 in the respects (1) to (4) mentioned above.

Figure 17:
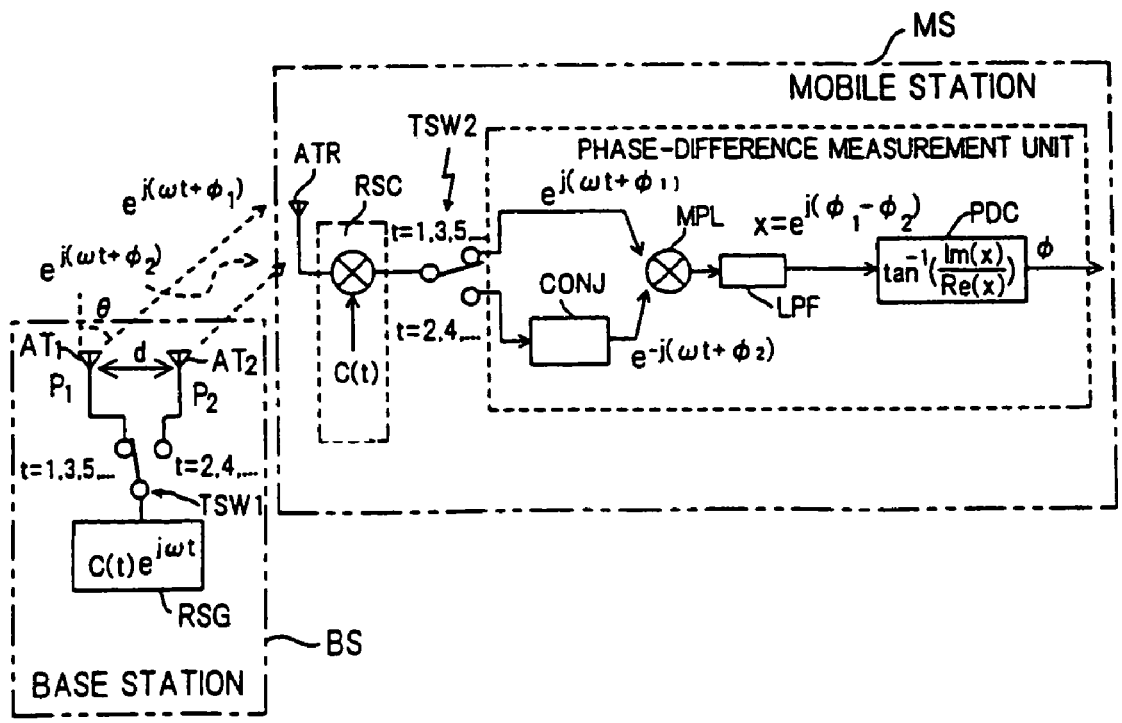
FIG. 17 is a diagram illustrating a modification of the second embodiment, in which the same signal is time-shared and transmitted.

FIG. 17 illustrates a modification of the second embodiment, in which the same signal is transmitted as the first and second reference signals in time-shared fashion. Components identical with those shown in FIG. 9 are designated by like reference characters. This arrangement differs in that the direction estimator DES is removed from the mobile station MS and the phase difference $\phi$ is fed back from the mobile station to the base station.

(D) Third Embodiment

Figure 18:
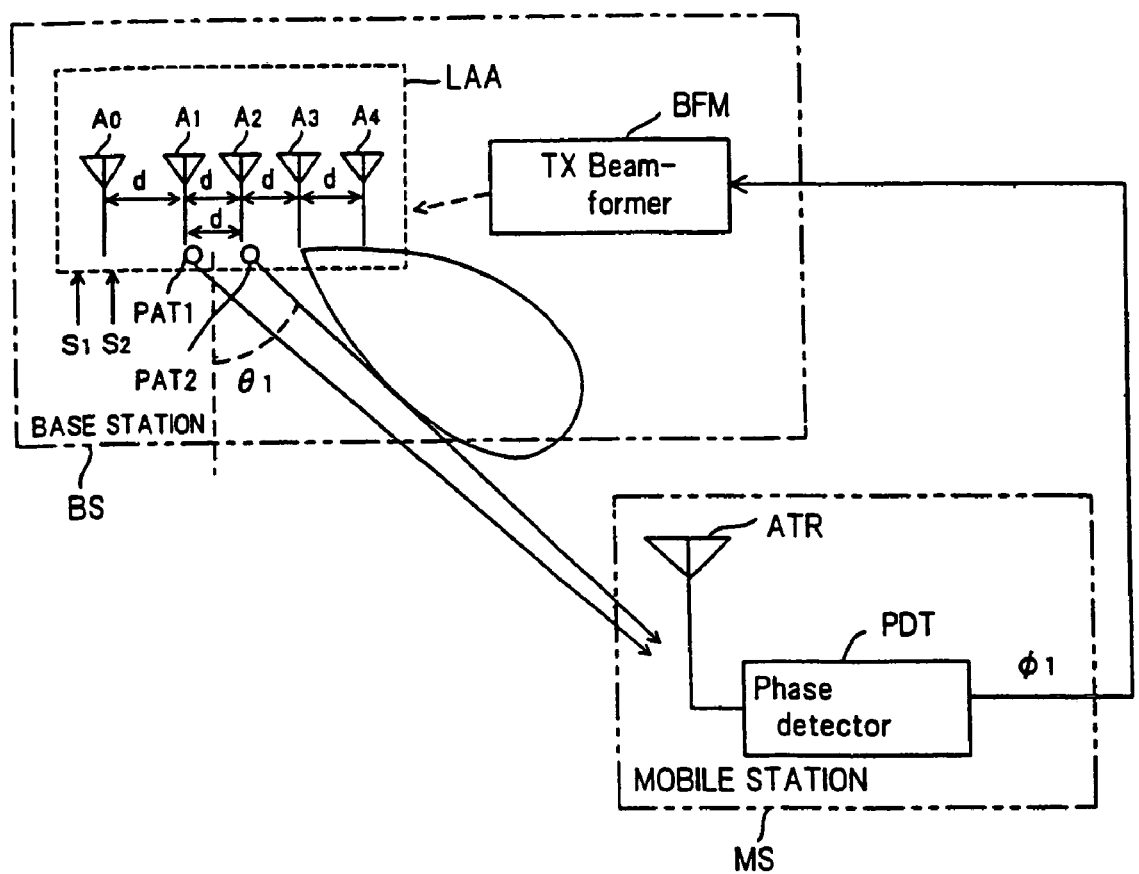
FIG. 18 is a diagram illustrating the construction of the third embodiment.

FIG. 18 is a diagram useful in describing an overview of a third embodiment according to the present invention. Components identical with those of the second embodiment shown in FIG. 15 are designated by like reference characters. This embodiment differs in that the antenna for transmitting the direction-measurement signal is eliminated and the direction-measurement signal is transmitted from the equally spaced linear array antenna LAA.

As described in conjunction with FIG. 3, the phase of the signal $S_1$ is delayed successively by 0, $\phi$, $2\phi$, $3\phi$, ..., $(m-1)\phi$ and the delayed signals are input to the antenna elements $AT_0$ to $At_{m-1}$, respectively, of the equally spaced linear array antenna LAA. Further, in order that the phase reference point of signal $S_2$ will be shifted from the phase reference point of signal $S_1$ by the spacing d of the antenna elements of the equally spaced linear array antenna LAA, the phase of the signal $S_2$ is delayed successively by 0, $\phi$, $2\phi$, $3\phi$, ..., $(m-1)\phi$ and the delayed signals are input to respective ones of the antenna elements $AT_1$ to $AT_m$. If current is thus applied to the antenna elements of the equally spaced linear array antenna LAA, it will be just as if first and second reference signals $$S_1' = S_1[1+\exp(j\phi)+\exp(2j\phi)+\exp(3j\phi)]$$

$$S_2' = S_2[1+\exp(j\phi)+\exp(2j\phi)+\exp(3j\phi)]$$

had been emitted from two imaginary antennas PAT1, PAT2 having a spacing d between them. As a consequence, the phase difference between the first and second reference signals which the mobile station MS in the direction $\theta_1$ receives from the base station BS becomes $\phi_1$. However, $\phi_1$ is the phase difference between the first and second reference signals which the mobile station MS in the direction $\theta_1$ receives from two imaginary antennas PAT1, PAT2 having the spacing d between them.

Figure 3B:
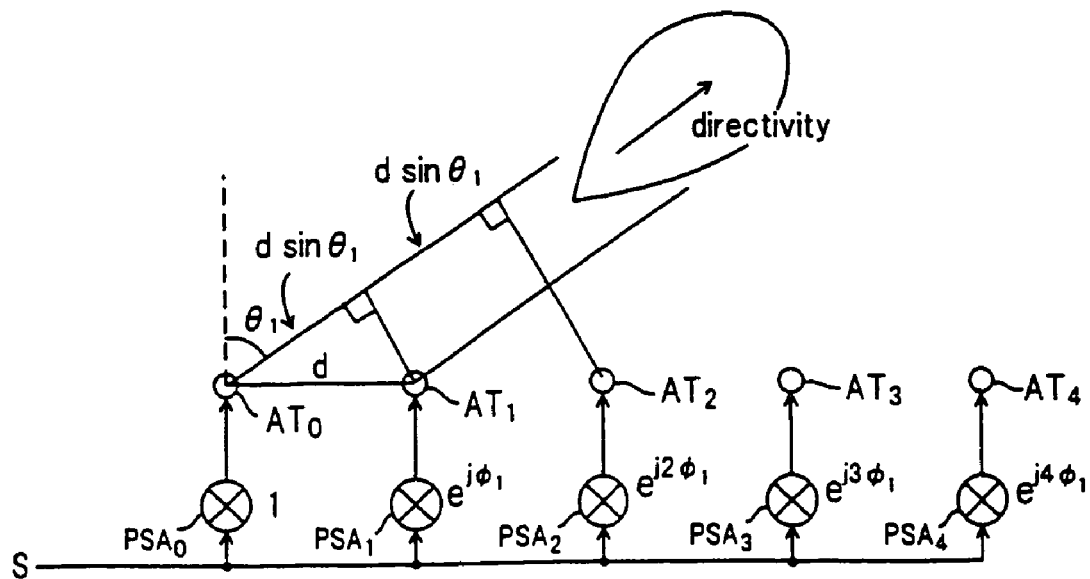

Accordingly, the phase-difference measurement unit PDT of the mobile station MS detects the phase difference $\phi_1$ and feeds the phase difference back to the base station BS, and the transmit beamformer BFM of the base station supplies current to the antenna elements $AT_0$ to $AT_{m-1}$ of the equally spaced linear array antenna upon delaying the phase of the data signal S successively by 0, $\phi_1$, $2\phi_1$, $3\phi_1$, ..., $(m-1)\phi_1$, as shown in FIG. 3B. As a result, the base station can transmit a signal to the receiver upon applying the directivity $\theta_1$.

(b) Base-Station Transmitter of Third Embodiment

Figure 19:
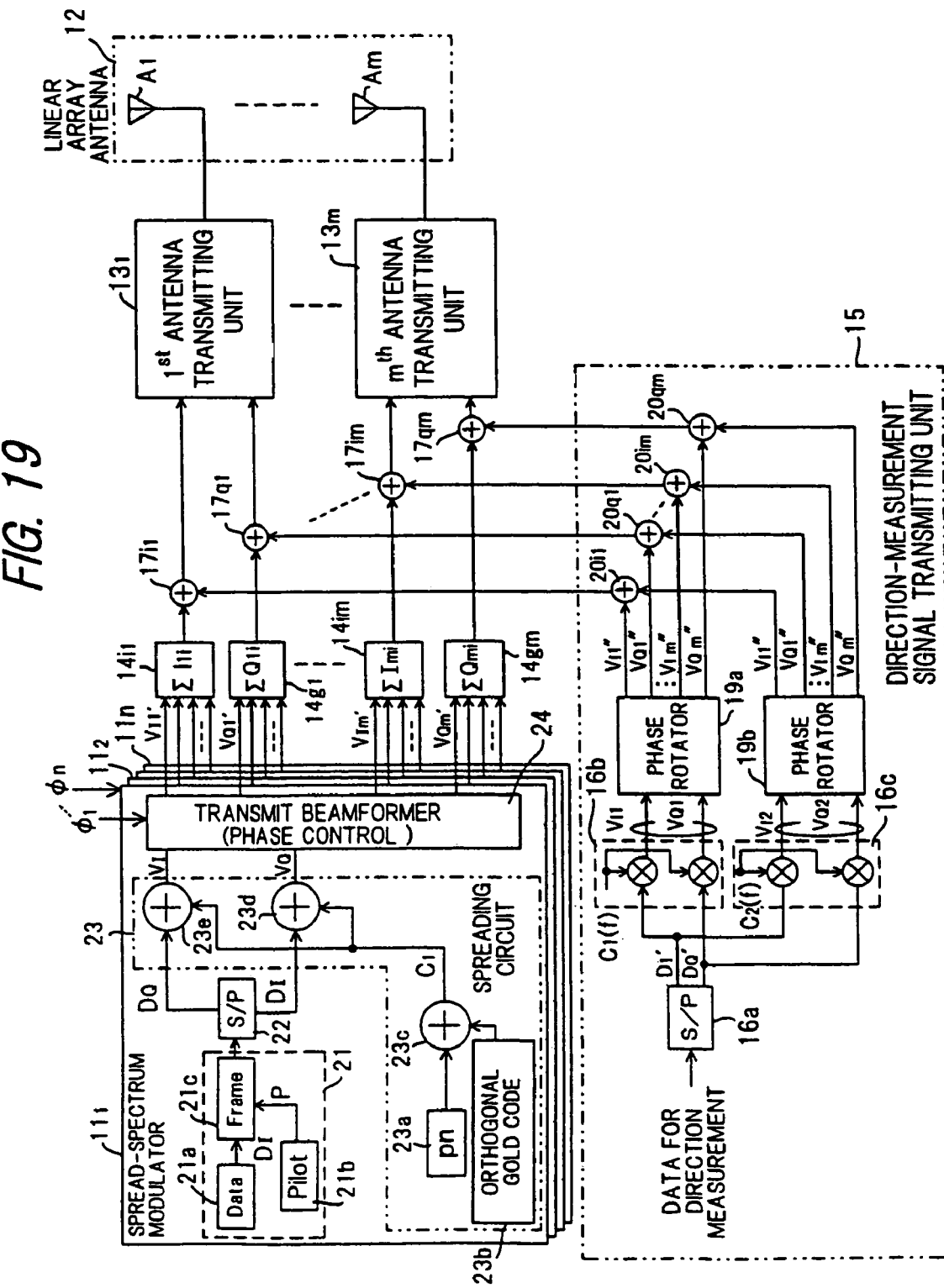
FIG. 19 is a diagram useful in describing the construction of a base-station transmitter according to the third embodiment.

FIG. 19 is a diagram showing the construction of a base-station transmitter according to the third embodiment, in which components identical with those of the transmitter of the first embodiment shown in FIG. 10 are designated by like reference characters. This embodiment differs in the following respects:

(1) the construction of the signal transmitting unit 15 for direction measurement; and (2) the construction of the signal transmitting unit 15 for direction measurement applies the direction-measurement signal to the antenna elements $A_1$ to $A_m$ of the equally spaced linear array antenna LAA via combiners $17i_1$, $17q_1$ to $17i_m$, $17q_m$ and transmitting units $13_1$ to $13_m$.

The S/P converter 16a alternately distributes a direction-measurement data sequence one bit at a time to convert the data to in-phase component and quadrature-component data sequences $D_I'$, $D_Q'$, and the first despreader 16b multiplies the sequences $D_I'$, $D_Q'$ by the spreading code $C_1(t)$ to spread the same and input the resultant signals to a first phase rotator 19a. The second spreader 16c multiplies the sequences $D_I'$, $D_Q'$ by the spreading code $C_2(t)$ to spread the same and input the resultant signals to a second phase rotator 19b. The first phase rotator 19a rotates the signal point position vector $V_1$ of the spread-spectrum modulated signals $V_{I1}$, $V_{Q1}$, which enter from the first spreader 16b, successively by 0, $\phi_1$, $2\phi_1$, $3\phi_1$, ..., $(m-1)\phi_1$ and outputs the result. That is, the first phase rotator 19a performs the calculations indicated by the following phase rotation equations:

$$V_{IJ}'' = V_{I1} \cdot \cos \phi_j - V_{Q1} \cdot \sin \phi_j$$

$$V_{QJ}'' = V_{I1} \cdot \sin \phi_j + V_{Q1} \cdot \cos \phi_j$$

(where $\phi_j = j \cdot \phi_1$, j=0 to m-1) and outputs the result.

The second phase rotator 19b rotates the signal point position vector $V_2$ of the spread-spectrum modulated signals $V_{I2}$, $V_{Q2}$, which enter from the second spreader 16c, successively by 0, $\phi_1$, $2\phi_1$, $3\phi_1$, ..., $(m-1)\phi_1$ and outputs the result. That is, the second phase rotator 19b performs the calculations indicated by the following phase rotation equations:

$$V_{IJ}'' = V_{I2} \cdot \cos \phi_j - V_{Q2} \cdot \sin \phi_j$$

$$V_{QJ}'' = V_{I2} \cdot \sin \phi_j + V_{Q2} \cdot \cos \phi_j$$

(where $\phi_j = j \cdot \phi_1$, j=0 to m-1) and outputs the result.

Combiners $20i_1$, $20q_1$ to $20i_m$, $20q_m$ combine corresponding signals output from the first and second phase rotators 19a, 19b and feed current to the antenna elements $A_1$ to $A_m$ of the equally spaced linear array antenna LAA via the combiners $17i_1$, $17q_1$ to $17i_m$, $17q_m$ and transmitting units $13_1$ to $13_m$.

The above is equivalent to emitting the first and second reference signals from two imaginary antennas having the spacing d; the phase difference between the first and second reference signals received from the base station BS by the mobile station in the direction $\theta_1$ is $\phi_1$. The phase-difference measurement unit PDT of the mobile station MS detects the phase difference $\phi_1$ and feeds the phase difference back to the base station BS. In the base station, the beamformer 24 of the channel corresponding to the mobile station supplies current to the antenna elements $AT_0$ to $AT_m$ of the equally spaced linear array antenna upon delaying the phase of the input data successively by 0, $\phi_1$, $2\phi_1$, $3\phi_1$, ..., $(m-1)\phi_1$. As a result, the transmitter of the base station can transmit a signal to the mobile station upon applying the directivity $\theta_1$.

The foregoing relates to a case where different signals $S_1$, $S_2$ are input to an equally spaced linear array antenna simultaneously. However, it is possible to adopt an arrangement in which the same signal is input to the equally spaced linear array antenna alternately in time-shared fashion as the signals $S_1$, $S_2$.

(E) Fourth Embodiment

Radio-wave propagation in mobile communication involves a multiplexed propagation environment (multipath environment) in which, in addition to direct waves (diffracted waves), waves that have been reflected and scattered by buildings and mountains, etc., arrive simultaneously. In such a multipath environment, direction from a transmitter cannot be determined accurately even if the phase difference between received signals is measured. Among waves that arrive via multiple paths, a wave that arrives earliest in time is considered to be a wave that arrives directly from a transmit antenna or wave that is directly diffracted. Accordingly, if a wave that arrives earliest in time is selected and then phase difference is measured, the direction of the mobile station can be measured accurately.

Figure 20:
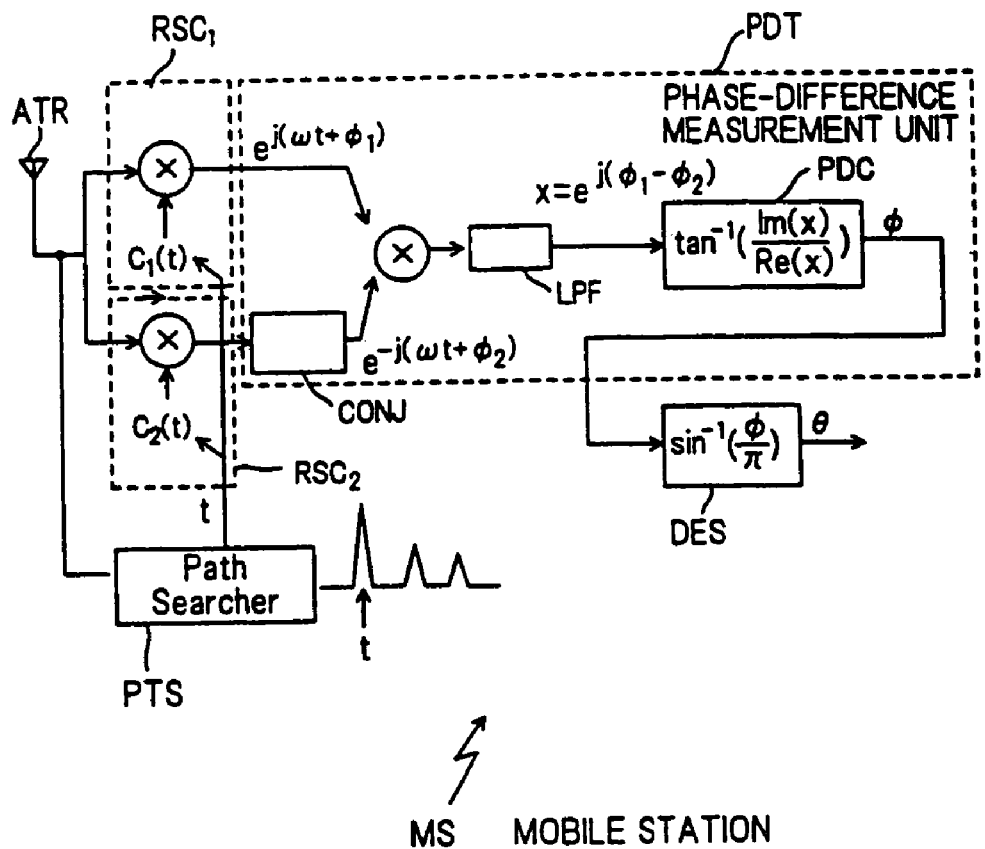
FIG. 20 is a diagram useful in describing a fourth embodiment.
Figure 21:
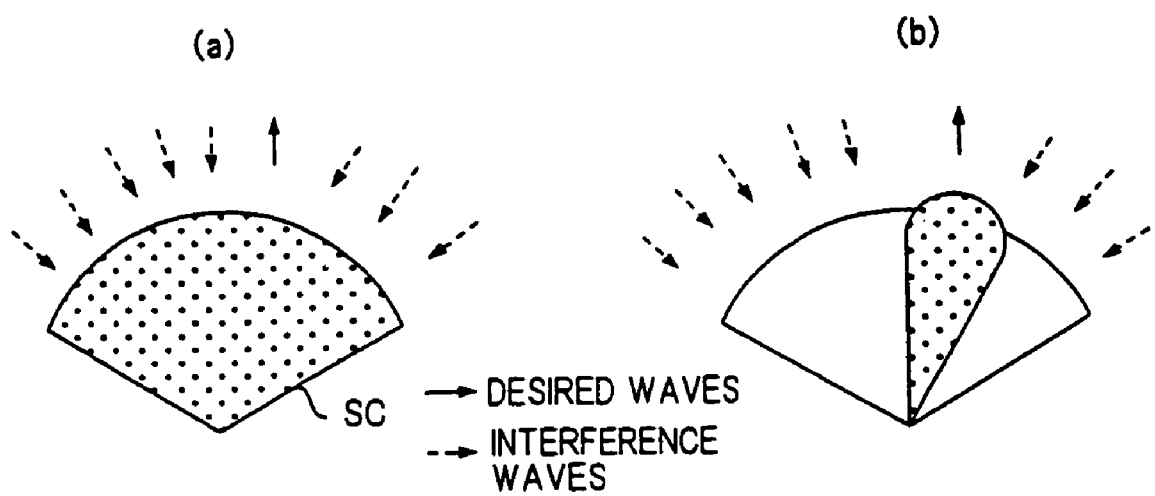
FIG. 21 is a diagram useful in describing a sector antenna according to the prior art.

FIG. 20 is a diagram illustrating the construction of a mobile-station receiver according to the fourth embodiment. Components in FIG. 20 identical with those of the mobile-station receiver of the first embodiment shown in FIG. 7 are designated by like reference characters. This embodiment differs in that a path searcher PTS is provided for detecting arrival time t of a direct wave, and in that the despreaders RSC1, RSC2 perform despreading at the timing of the detected time t. This method of measuring phase difference upon selecting a wave that arrives earliest can be applied to each of the embodiments described above.

Thus, in accordance with the present invention, the required transmission directivity can be obtained by simple computation, transmission power can be reduced and so can the power of interference. This makes it possible to increase the subscriber capacity of a mobile wireless communication system.

Further, in accordance with the present invention, the phase difference $\phi$ between first and second signals transmitted from two antennas for direction measurement is measured and the direction $\theta$ of a mobile station is found based upon the phase difference $\phi$. As a result, the direction of the receiver can be measured in a simple manner.

Further, in accordance with the present invention, direction is measured using the earliest arriving signal among signals that arrive on multiple paths. This makes it possible to measure direction accurately without the influence of radio waves that arrive owing to reflection or scattering.

Further, in accordance with the present invention, the spacing between two antennas that transmit first and second signals for direction measurement is made equal to the spacing between antenna elements of an equally spaced linear array antenna for data transmission, the phase difference φ between the first and second signals at the mobile station is measured, the phase of the transmit signal is delayed by 0, φ, 2φ, 3φ, . . . and the resultant signals are applied to the antenna elements of the equally spaced linear array antenna, whereby the transmit signal is emitted in the direction of the mobile station. As a result, the direction θ of the mobile station need not be calculated, thereby making it possible to simplify the construction of the apparatus.

Further, in accordance with the present invention, reference signals for direction measurement can be emitted from an equally spaced linear array antenna for data transmission and it is unnecessary, therefore, to separately provide an antenna for direction measurement.

Further, in accordance with the present invention, the same signal can be generated in time-shared fashion and input as first and second reference signals to an antenna for direction measurement. This makes it possible to simplify the construction of the apparatus.

As many apparently widely different embodiments of the present invention can be made without departing from the spirit and scope thereof, it is to be understood that the invention is not limited to the specific embodiments thereof except as defined in the appended claims.

What is claimed is:

1. A base-station transmitter for emitting radio waves upon providing the radio waves with directivity in the direction of a receiver, comprising:

means for generating first and second signals that have been spread by spreading codes;

two antennas disposed at different positions for transmitting the first and second signals;

a demodulator for receiving from a receiver and demodulating (a) the phases of the first and second signals, which have been transmitted from respective ones of said antennas, at the receiver, or (b) phase difference between each of these signals at the receiver, or (c) direction of the receiver, as seen from the base-station transmitter, calculated based upon said phase difference at the receiver; and a directional antenna for transmitting data by emitting radio waves upon providing the radio waves with directivity in the direction of the receiver based upon the phases, phase difference or direction of the receiver.

2. A base-station transmitter for emitting radio waves from an antenna upon providing the radio waves with directivity in the direction of a receiver, comprising:

means for generating first and second reference signals that have been spread by spreading codes;

an equally spaced linear array antenna, which has $1^{st}$ to $n^{th}$ antenna elements, for emitting the first and second reference signals and a data signal;

means for inputting signals, which have been obtained by applying a predetermined phase difference successively to the first reference signal, to $1^{st}$ to $(n-1)^{th}$ antenna elements of the equally spaced linear array antenna in succession, and inputting signals, which have been obtained by applying said phase difference successively to the second reference signal, to $2^{nd}$ to $n^{th}$ antenna elements of the equally spaced linear array antenna in succession in such a manner that a phase reference point of the first and second reference signals will be shifted by an amount equivalent to an interval of the antenna elements of the equally spaced linear array antenna;

a demodulator for receiving from the receiver and demodulating a phase difference $\Phi_1$ between the first and second signals, which have been transmitted from respective ones of said antennas, at the receiver; and means for successively applying the phase difference in steps of $\Phi_1$ to the data signal and inputting the resultant signals to each of the antenna elements of said equally spaced linear array antenna; whereby data is transmitted toward the receiver by emitting radio waves upon providing the radio waves with directivity in the direction of the receiver.

* * * * *